Oct. 19, 1954  A. J. COBHAM ET AL  2,692,102
APPARATUS FOR TOWING AND REFUELING AIRCRAFT IN FLIGHT
Filed March 31, 1950  19 Sheets-Sheet 6
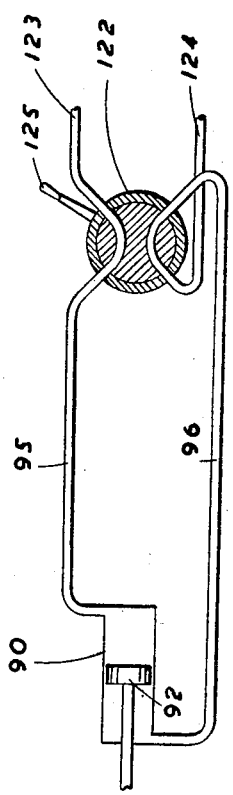
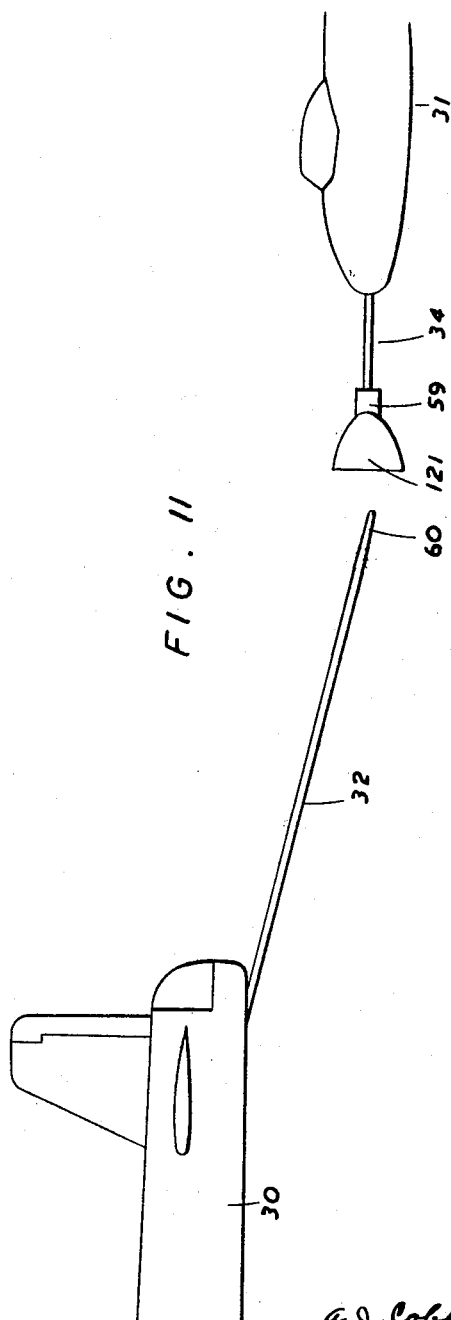

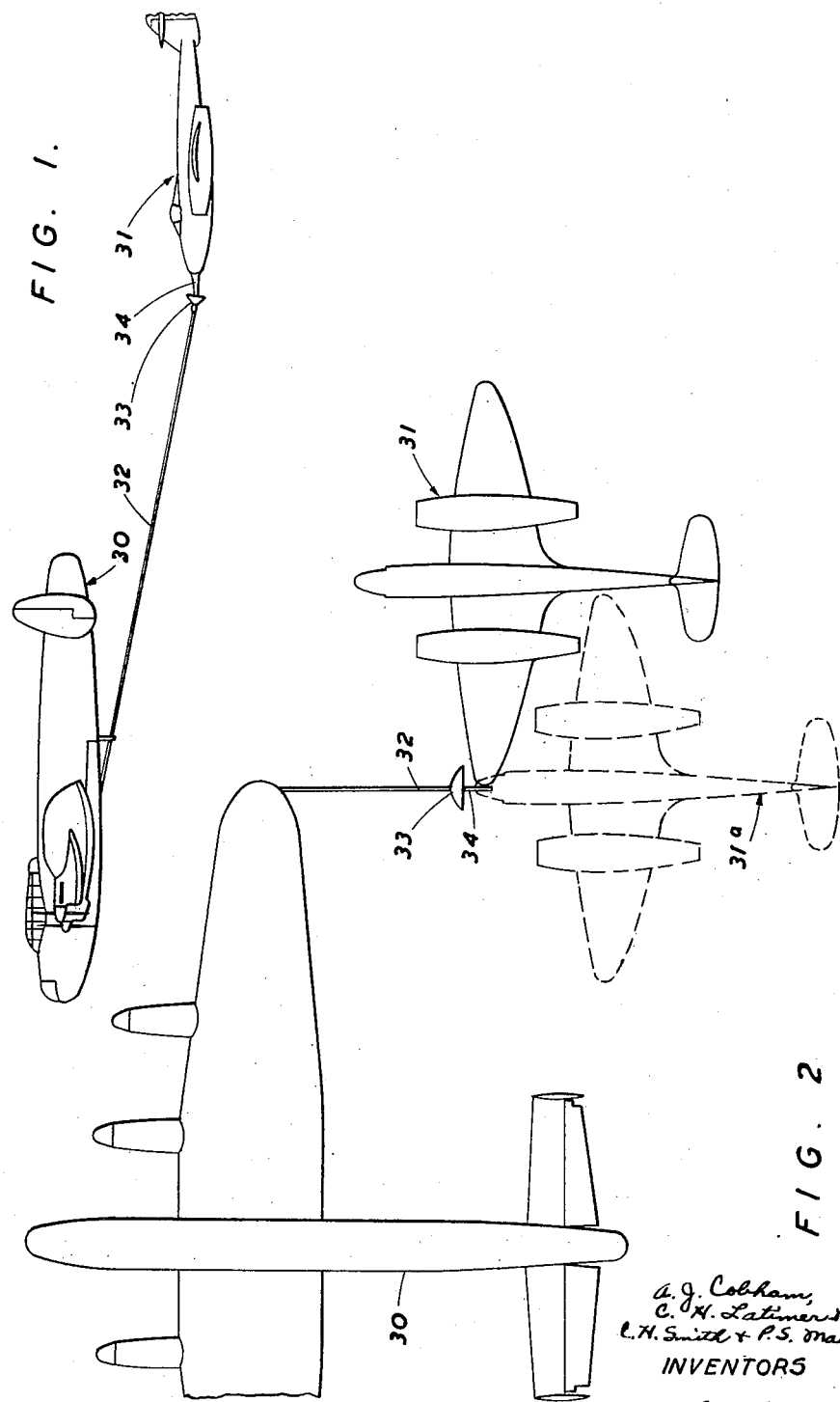

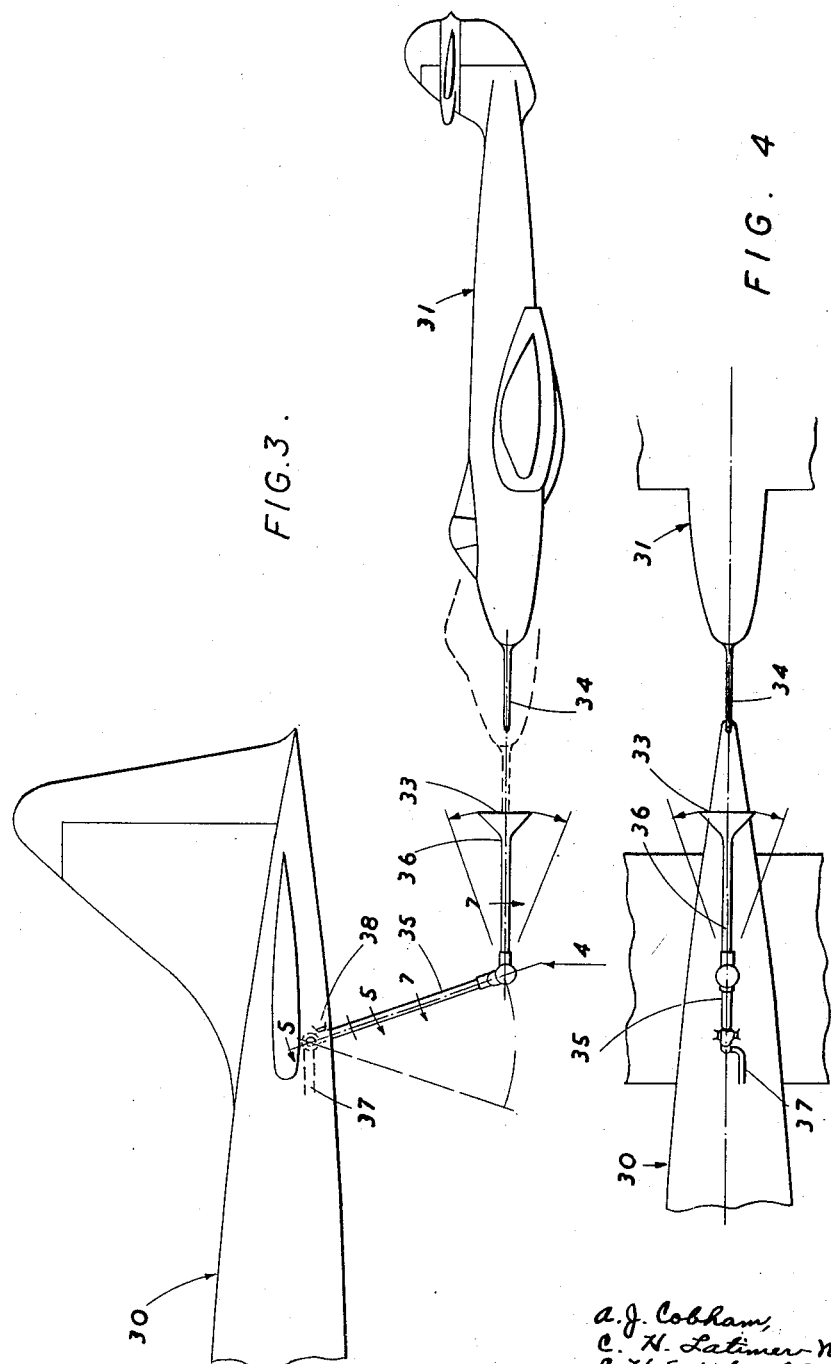

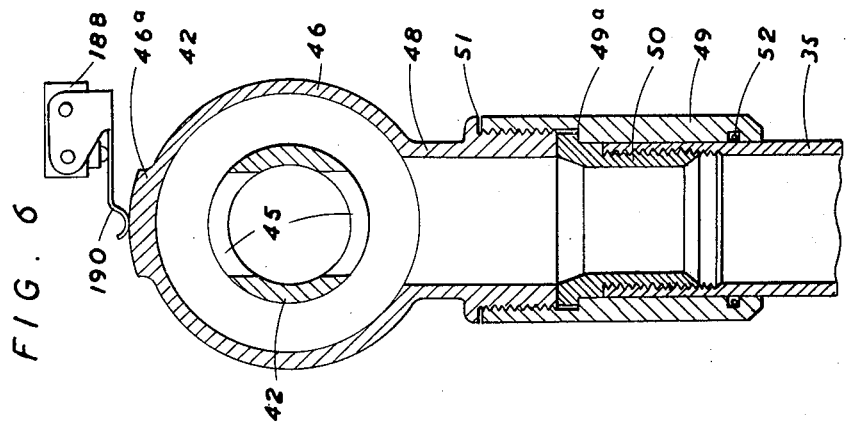
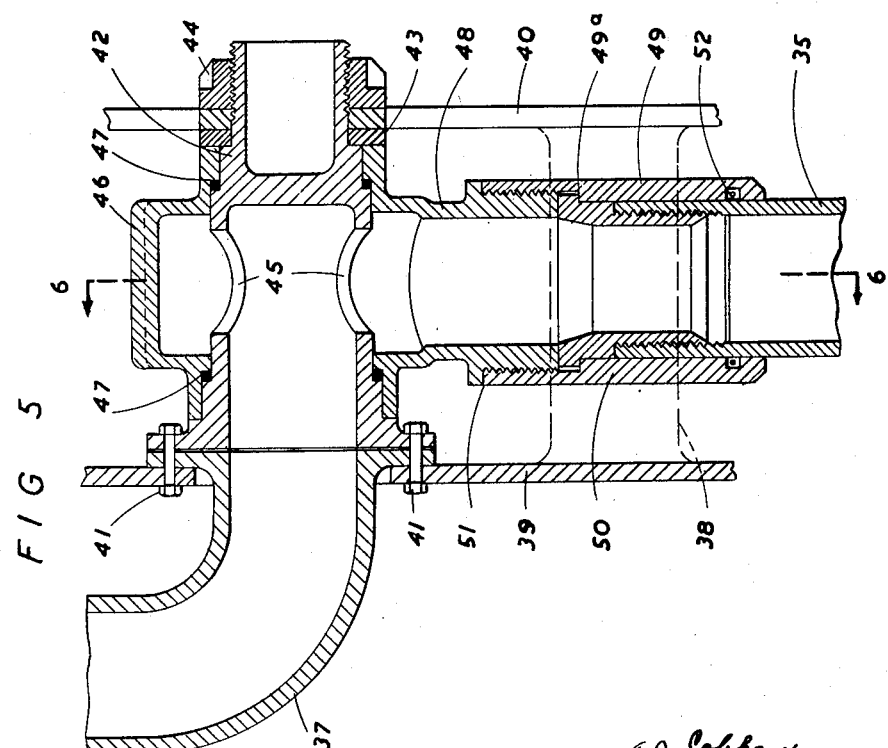

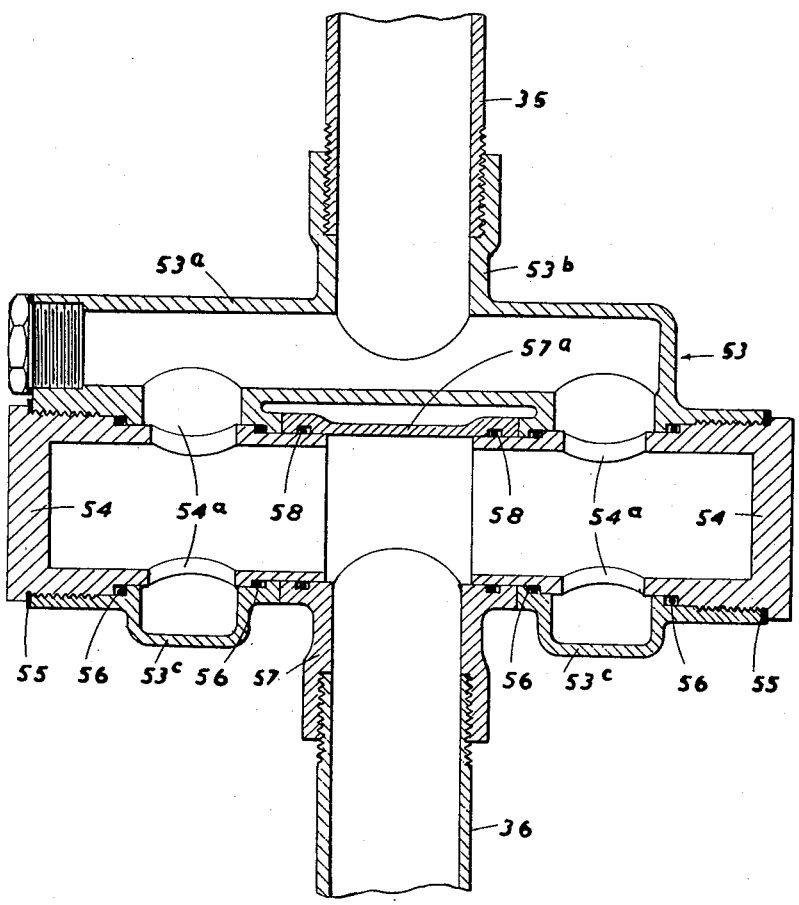

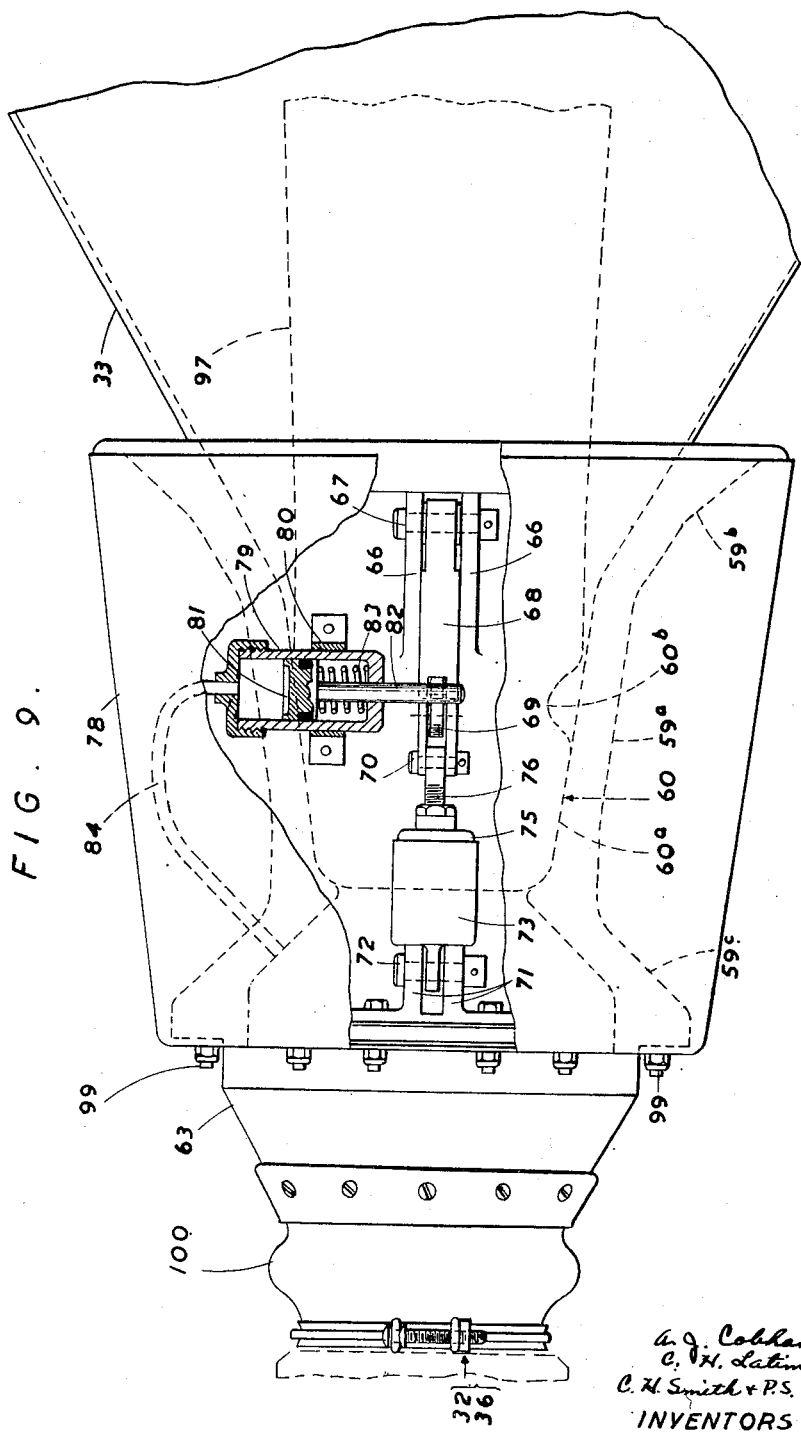

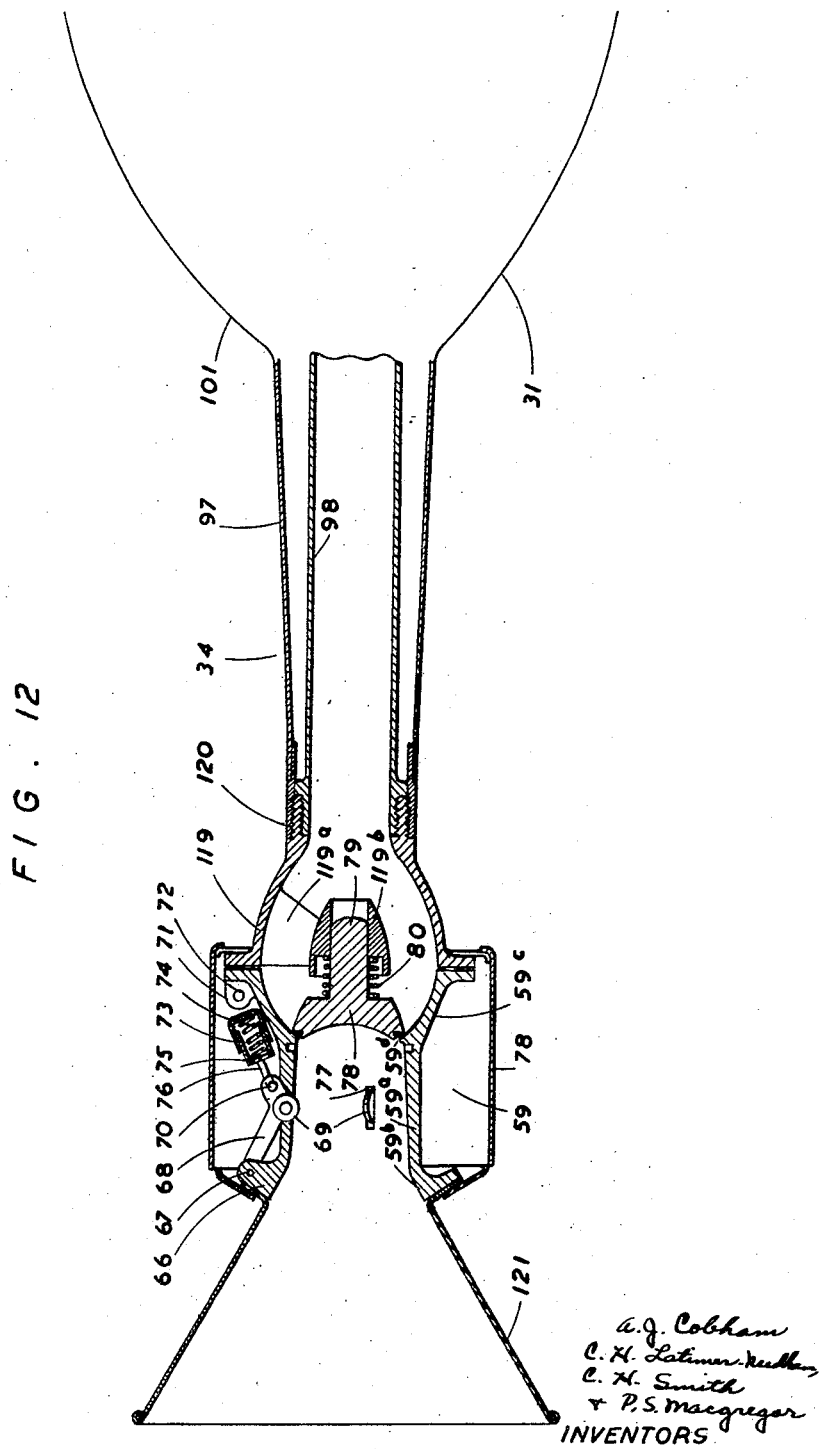

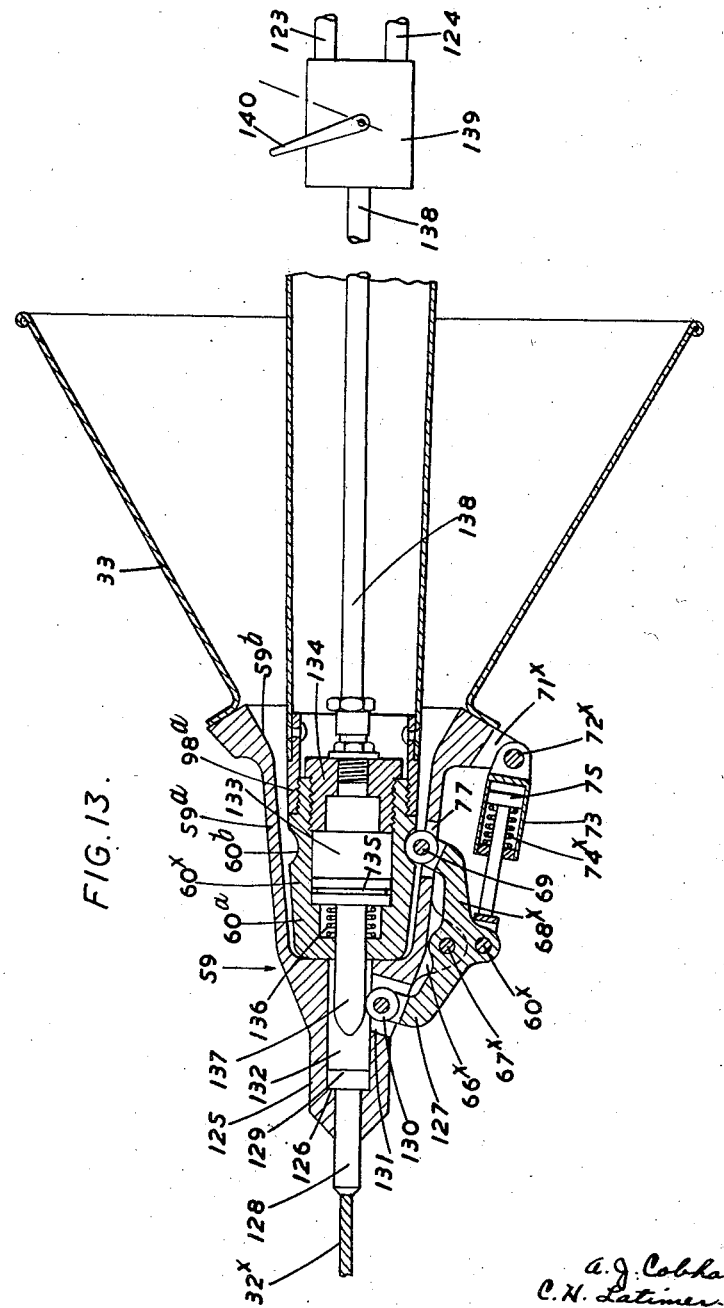

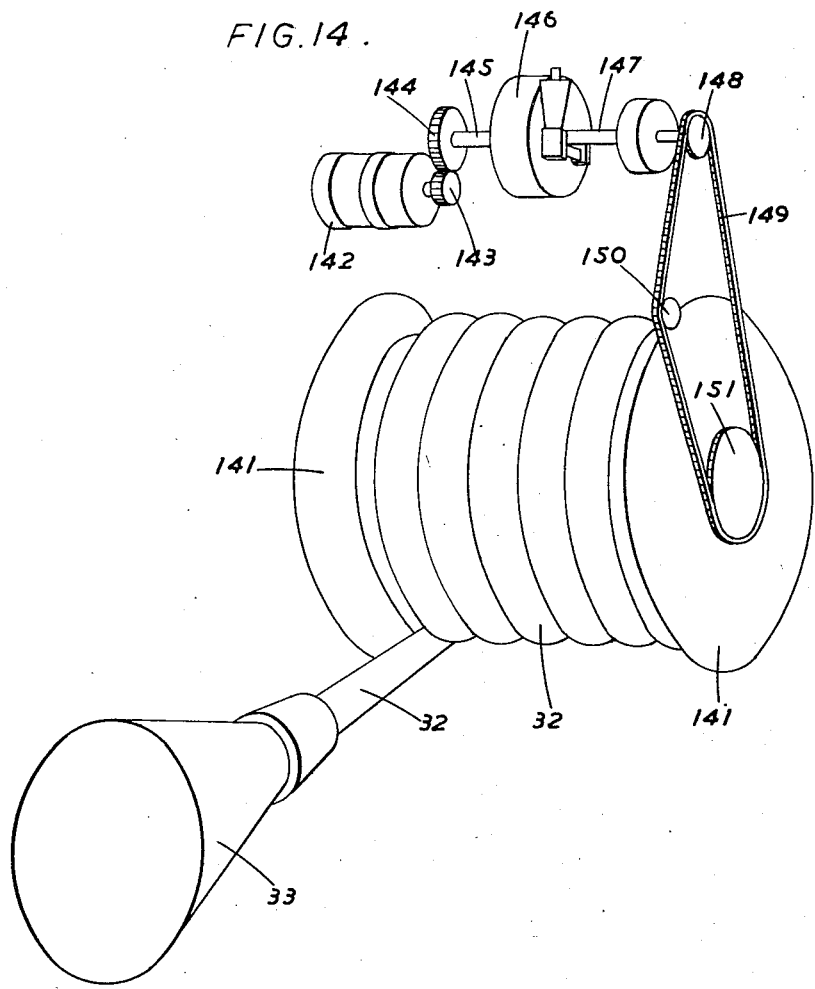

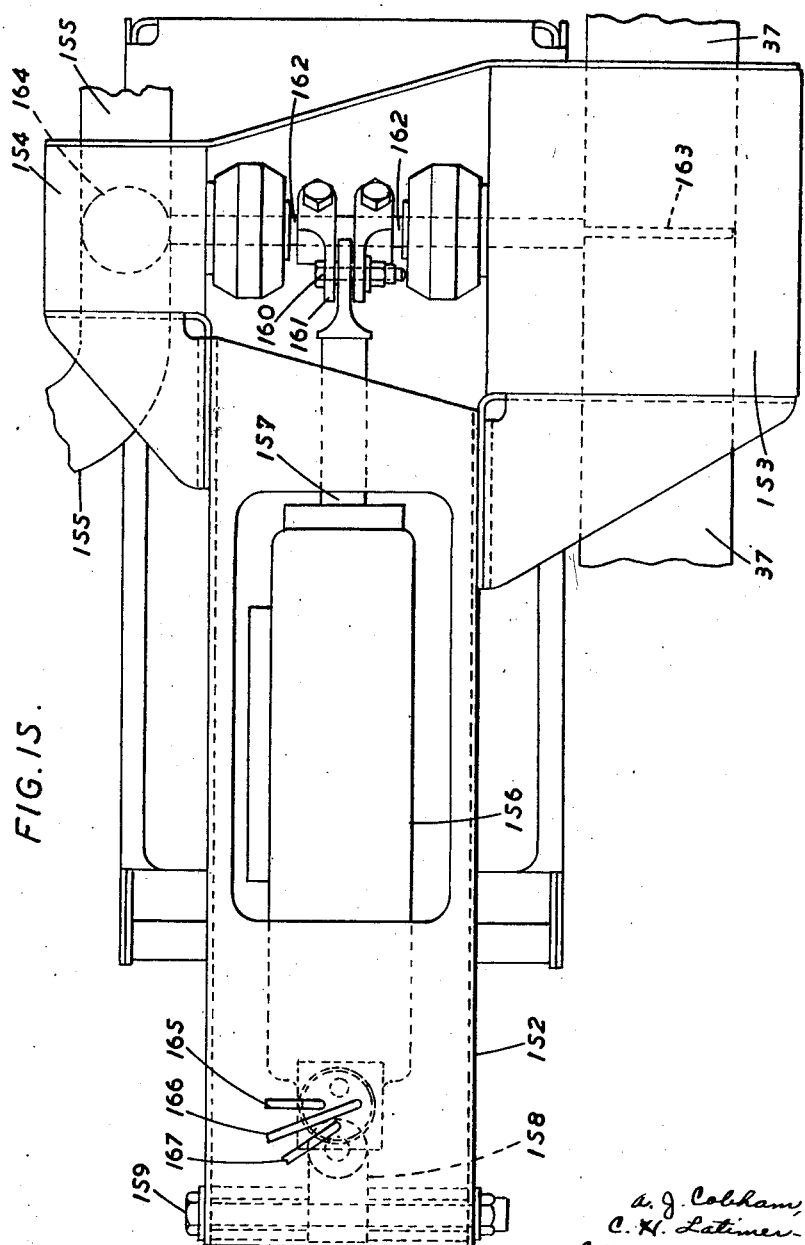

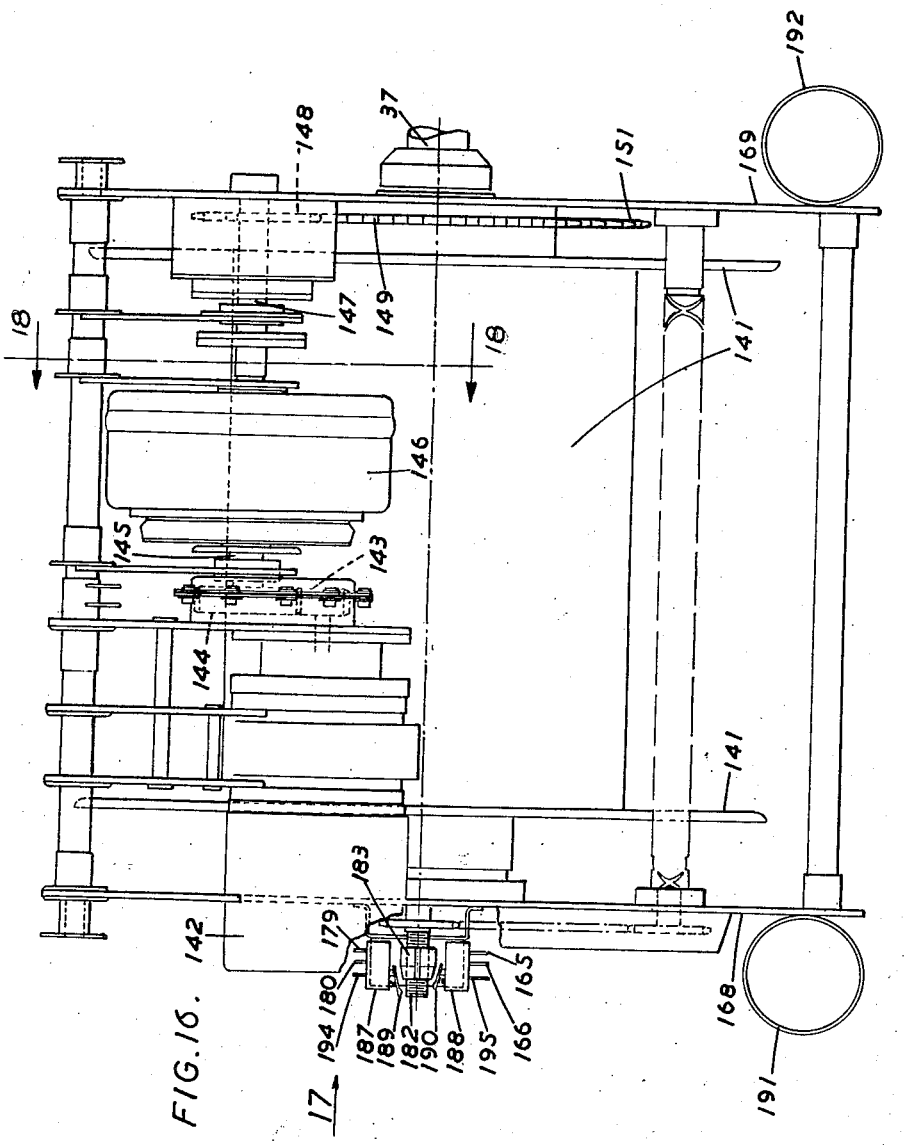

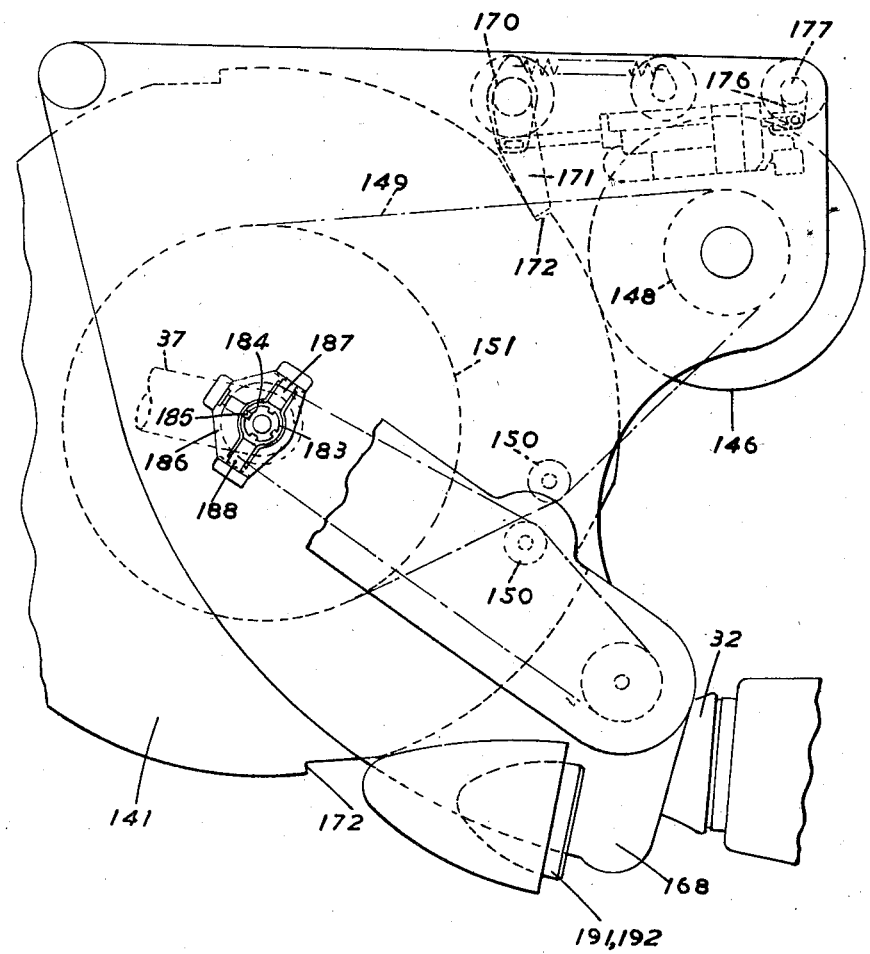

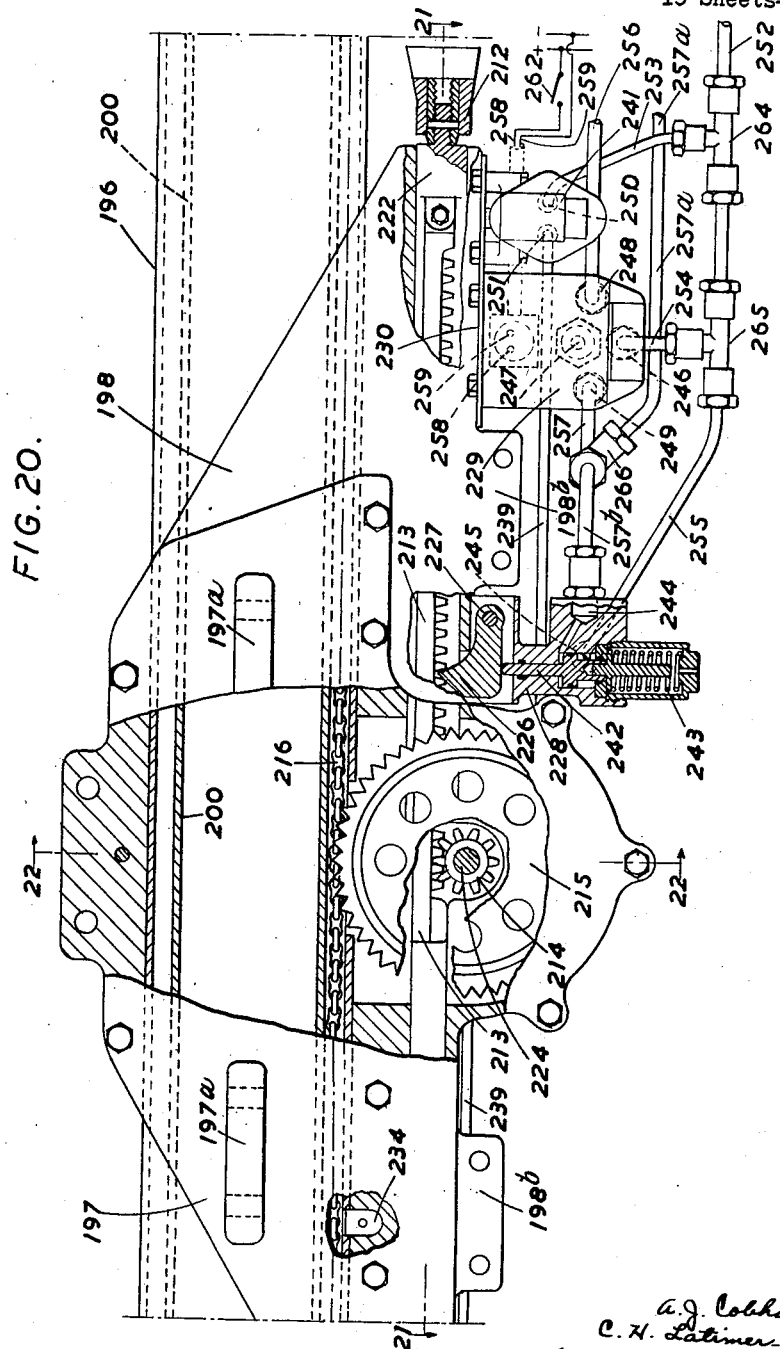

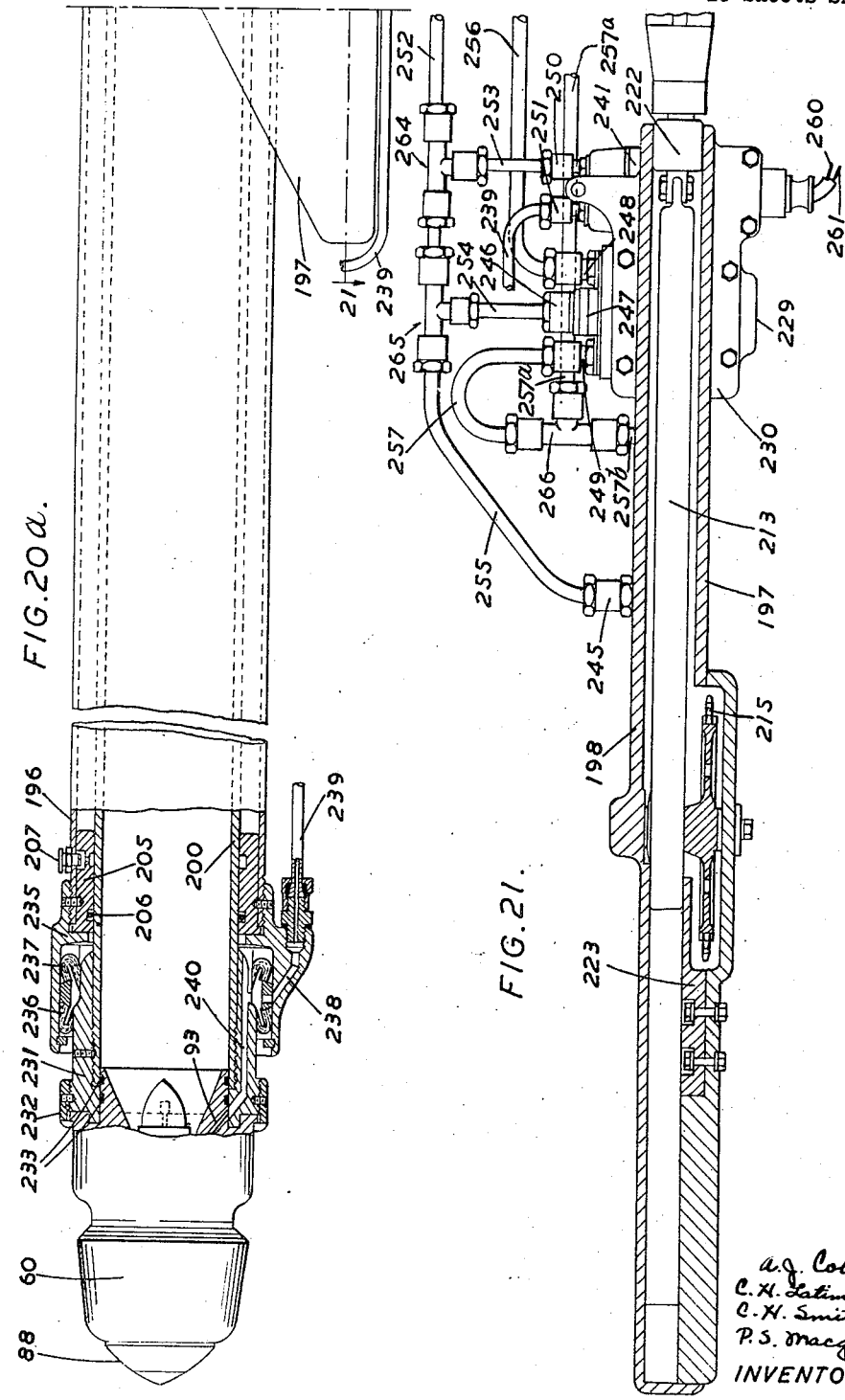

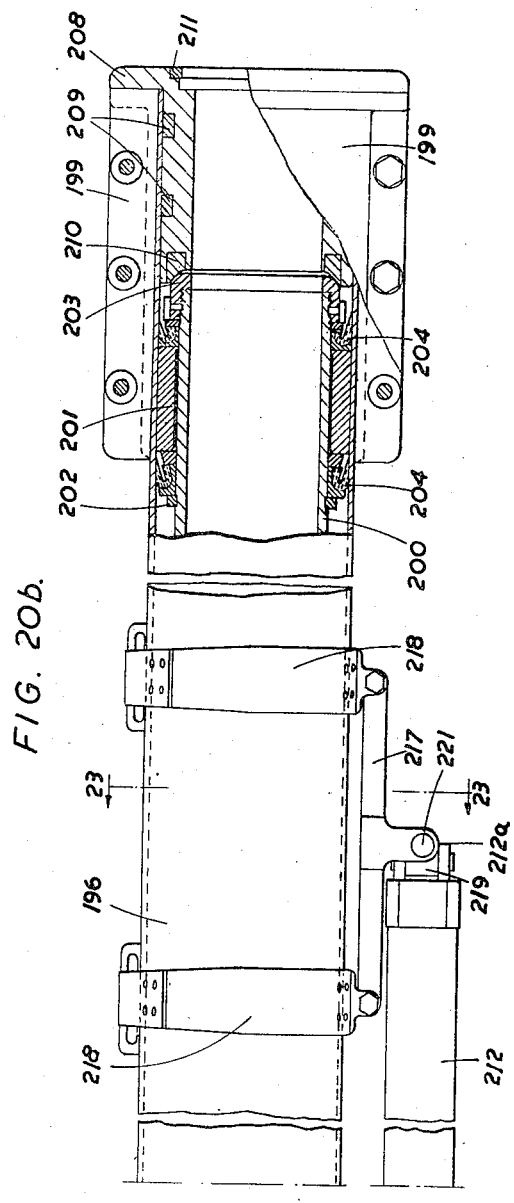

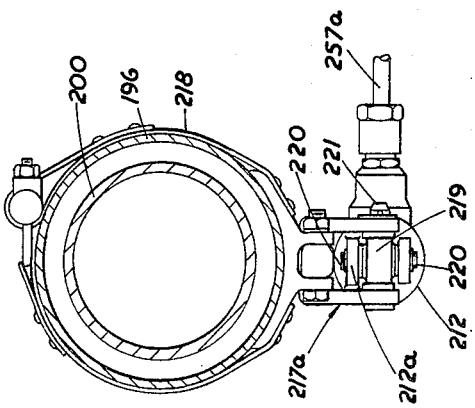
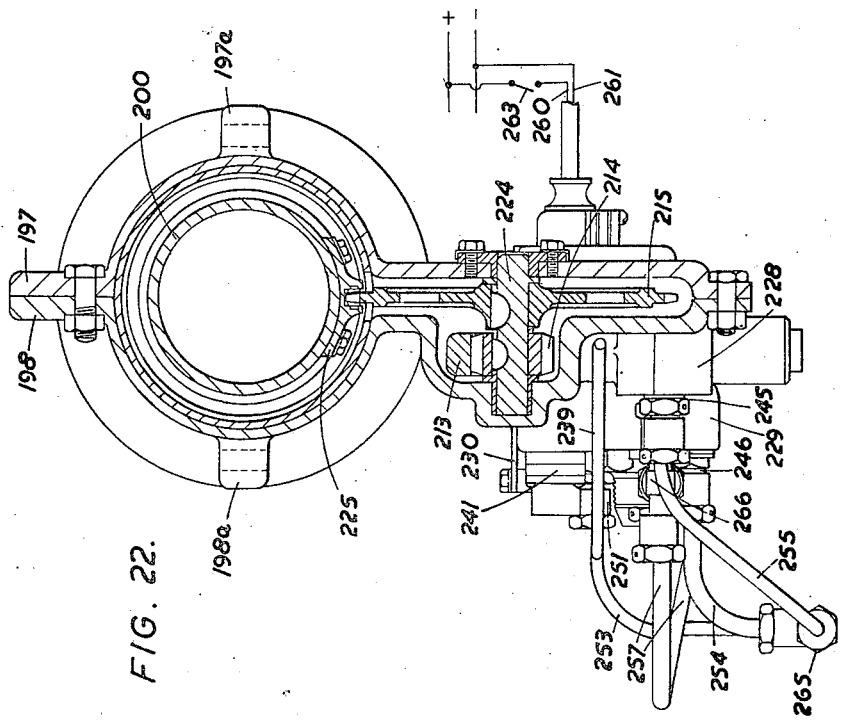

Patented Oct. 19, 1954

2,692,102

UNITED STATES PATENT OFFICE 2,692,102

APPARATUS FOR TOWING AND REFUELING AIRCRAFT IN FLIGHT

Alan John Cobham, Middleton-on-Sea, and Cecil Hugh Latimer-Needham and Charles Harry Smith, Bognor Regis, and Peter Stevens Macgregor, Lytchett Matravers, Poole, England, assignors to Flight Refuelling Limited, London, England, a British company Application March 31, 1950, Serial No. 153,198

Claims priority, application Great Britain April 1, 1949

28 Claims. (Cl. 244—135)

This invention relates to the refuelling of aircraft in flight, including the transference of liquids other than fuel, and to the picking-up and casting off of a tow between two aircraft in flight.

The main object of the invention is to enable these actions to be carried out by a novel method, of a much simpler and more direct kind than methods hitherto used, whereby the somewhat cumbrous operations of passing a line from one aircraft to the other, making a connection to a refuelling hose and passing the hose back again for connection to a refuelling coupling are eliminated.

It is a further object of the invention to provide a method and apparatus adaptable in essence either to refuelling or to taking another aircraft in tow and releasing it again in flight, with or without refuelling. The earlier methods mentioned above were unsuited to towing since connection had necessarily to be established by elements trailed from each aircraft, the completed connection being in the form of a trailing loop. Our novel method is equally applicable to refuelling and to the establishment and releasing of a towing connection between two aircraft, the essential elements of the apparatus in either case being substantially the same. Both functions may be combined by using a form of the apparatus adapted for refuelling and having sufficient strength in its several parts and connections and in its anchorages to the aircraft concerned to sustain the towing loads.

In our novel method the first or leading aircraft trails a relatively short element which, when refuelling is in question, is hollow and constitutes a fuel-conveying pipe, and the second or following aircraft, approaching from behind, thrusts a rigid, forwardly extending element, which may likewise be hollow to act as fuel conveying pipe, into or onto the extremity of the trailing element, whereupon a spring-latch device couples the elements together. It is preferable that the trailing element be either in itself flexible or include or be connected to the aircraft by means of articulated joints, so that its extremity has at least limited freedom to swing vertically and laterally to accommodate minor changes of station of the following aircraft after connection has been established. It is also preferable that this element should not extend rigidly rearwards, being so constructed or mounted that its extremity can yield forwardly when subjected to the thrust of the rigid element mounted on the following aircraft. At the same time sufficient resistance to this thrust must be exerted to enable the engaging force of the spring latch device to be overcome. To provide for this the trailing element may carry at or near its extremity some form of drogue or drag-creating device which furnishes the necessary resistance; such a drogue may also serve to cause the trailing element to trail without pronounced droop.

The hitherto known methods mentioned above are inherently inapplicable to the refuelling of small aircraft and single seaters owing to the bulk and complexity of the apparatus installed in the "receiver" and the need in practice for a second crew-member to operate it, even if its action is largely automatic.

A technique for refuelling or/and towing relatively small aircraft and single-seaters and appropriate apparatus for this purpose is therefore part of the objects of our invention; and the novel method described above with the "tanker" or "tug" in the lead and the small aircraft following is suited to this purpose on account of its simplicity and because the apparatus installed in the following aircraft is light, simple and compact and only needs the simplest control, if any.

Another object of the invention is to enable more than one (smaller) aircraft to be simultaneously refuelled and/or towed by a larger aircraft. This is rendered possible by the relative shortness of the trailing element and its relative compactness when retracted and stowed enabling one large aircraft to trail connecting elements from both wing tips and from the tail.

Provided the following or towed aircraft keeps accurate station, which is not difficult in close formation, there is no serious risk of collision and entanglement of the connecting elements is almost impossible.

The element trailed by the leading aircraft may be a short length of hose, or hawser, mounted on a reel or windlass, or a jointed pipe, or rod, connected to the aircraft by a joint providing for limited fore and aft swing and from which the inboard part of the pipe or rod depends approximately vertically with the outboard part trailing approximately horizontally from a joint providing for vertical swing by which it is connected to the inboard part, a further joint, e. g. a swivel joint in the inboard part, being provided to enable the end of the outboard part to swing laterally. Alternatively, a rigid telescopic pipe or member mounted on a universal joint with spring centring means may be used.

Yet a further object of the invention is the provision of a simple and reliable means for establishing the connection between the fuel-conveying or/and towing elements of the two aircraft and for bringing their extremities into the correct relative position without calling for too high a skill in "aiming" on the part of the pilot of the following aircraft. This is accomplished by providing one element usually the rigid, forwardly extending element of the "follower," with a tapering spigot-like extremity, or nozzle, having a circumferential groove near the tip, and the other element with a socket, comprising a flared, cup-like portion, which may be unitary with the drogue previously referred to, terminating inwardly in a funnel-shaped portion into which the spigot or nozzle of the other element is guided by the flared portion, the socket being provided with spring-loaded latches, which engage in the groove of the spigot or nozzle when the latter enters the terminal part of the socket, and retain the spigot or nozzle in the socket.

A yet further object of this part of the invention is to ensure that the latches can be sprung into engagement by a relatively light thrusting forward of the follower's rigid, forwardly extending element and that they can be sprung out of engagement by applying a critical tension to the coupled elements, such critical tension being preferably greater than the thrust required to bring about engagement, and this, as will be seen hereinafter, is accomplished primarily by appropriately shaping the tapered tip and groove of the nozzle or spigot.

When refuelling is in question, if the following aircraft keeps its motor(s) running during the refuelling operation the critical tension at which the latches will automatically disengage may be relatively low and disconnection can then be effected merely by throttling down the follower's motor(s), when the drag of the following aircraft will furnish the required tension. If, however, the following aircraft is to be towed, the critical tension at which the latches will disengage must exceed the normal drag of the following aircraft with dead motor(s) and to effect disconnection the drag would have to be increased, e. g. by putting on flap, extending dive brakes, or lowering the undercarriage, or a combination of these expedients. It is also to be noted that if the towed aircraft starts its motor(s) before breaking away, the extra drag required to effect disconnection will be increased owing to the thrust of the motor(s) which may not be negligible even when idling.

This necessity for increased drag presents a serious difficulty especially if a quick breakaway under full power is required in an emergency and it is yet a further object of the invention to obviate it. This object is accomplished by not relying on the spring engagement of the latches to maintain the connection between the aircraft under the towing load, but by providing a controllable locking device to hold the latches positively in engagement, the control being exercisable remotely from one of the two aircraft, preferably the towed aircraft.

Yet again, an object of the invention is to ensure that when the following aircraft thrusts its rigid connecting element against the extremity of a hose or hawser trailed by the leading aircraft the slack is promptly taken up, and to ensure that this object is achieved the reel or windlass carrying the hose or hawser may be subjected continuously to a torque tending to wind in the hose or hawser, such torque being less than that imposed by the drag of the drogue. A preferred method of accomplishing this is to connect the reel or windlass to its driving motor through a fluid coupling and to keep the motor running at reduced power while the hose or hawser is paying out under the action of the drag imposed by the drogue and thereafter until the following aircraft has broken away, full power being applied to wind in the hose or hawser against the drag of the drogue.

Other objects of the invention as applied more particularly to refuelling apparatus comprise the provision of automatically or controllably actuated valves in the nozzle and socket and/or in the leading aircraft to which the trailing element is connected. One such valve may be located in the leading aircraft and be actuated to close the fuel passage when the trailing element approaches its full extension so that it is necessary for some slack to be taken up by the thrusting action of the rigid element of the following aircraft before the valve will open. Alternatively or in addition a spring-closed valve may be provided in the nozzle-receiving socket which is opened by a member mounted on the nozzle, either automatically on entry of the nozzle into the socket or by remote control from the following aircraft when the nozzle is fully home in the socket. This member may itself form part of a valve incorporated in the nozzle, which is either spring-loaded to close or is fully controllable by the pilot, or other crew-member, of the following aircraft, e. g. by means of a hydraulic, pneumatic, mechanical or electrical remote control.

To allow for errors in aiming and to minimise consequent side loading on the rigid forwardly extending element of the following aircraft when connection is being, or has been established, the rigid element may be mounted with limited freedom to swing about its root in any direction and be provided with spring centering-means.

Further, to minimise drag when not in use it may be retractably mounted, and this may be combined with an arrangement having as its object to facilitate the thrusting of it into engagement with the trailing element of the leading aircraft and to avoid the necessity of a burst of acceleration by the follower to effect this thrusting action, which, if overdone, might cause damage to the connecting elements or even a collision.

The arrangement referred to consists essentially in constructing the rigid element as a telescopic assembly, the movable part of which is connected to a mechanism under the control of the pilot for retracting or extending it, the extension being effected rapidly so that the movable part can be thrust forward smartly to make contact and engage with the trailing element of the leading aircraft. The operating mechanism is preferably pneumatic or hydraulic. From what has already been stated, it will be evident that, for refuelling purposes, the normal arrangement contemplated is that the leading aircraft will be the tanker, the follower being the receiver, but the reverse arrangement may be adopted if desired without substantial alteration of the apparatus.

How these objects and others as may hereinafter appear are achieved will be more fully understood from the following description having reference to the accompanying drawings illustrating, by way of example only, the general principles and methods of the invention and specific embodiments and modifications thereof, the scope of the invention being defined in the appended claims. In the drawings, Figure 1 is a schematic view in side elevation illustrating an aircraft being refuelled or/and towed by another aircraft using one form of the apparatus;

Figure 2 is a schematic plan view illustrating the same method and apparatus as in Figure 1, but showing alternative locations of the connecting elements on the two aircraft;

Figure 3 is a view similar to Figure 1 on an enlarged scale showing a modified form of apparatus;

Figure 4 is a schematic underneath plan view in the direction of arrow 4 of Figure 3;

Figure 5 is a sectional view on an enlarged scale on the line 5—5 of Figure 3 illustrating details;

Figure 6 is another detail sectional view on an enlarged scale on the line 6—6 of Figure 5;

Figure 7 is another detail sectional view on an enlarged scale on the line 7—7 of Figure 3;

Figure 8a is a hydraulic circuit diagram supplementing Figure 8;

Figure 9 is a plan (or elevation) viewed in the direction of arrow 9 of Figure 8 and partly sectioned;

Figure 11 is a view similar to Figure 3 illustrating an alternative form of apparatus;

Figure 12 is a somewhat schematic axial section of the apparatus carried by the following aircraft of Figure 11;

Figure 13 is a view similar to Figure 8 illustrating a modified form of coupling adapted for towing without refuelling connections;

Figure 14 is a schematic perspective view of the winding gear of a trailing hose or hawser as fitted in the leading aircraft of Figure 1;

Figure 15 is a plan view of a fuel and vent cock assembly forming part of the refuelling equipment of a tanker aircraft;

Figure 16 is a rear elevation partly in section of winding gear for a trailed hose element;

Figure 17 is an end elevation of the winding gear viewed in the direction of arrow 17 of Figure 16;

Figures 20, 20a and 20b are a view in side elevation of a modified form of probe-structure, Figures 20a and 20b being continuations of Figure 20;

Figure 21 is a plan section on the line 21—21 of Figures 20 and 20a;

Figure 22 is a section taken on the line 22—22 of Figure 20; and

Figure 23 is a section taken on the line 23—23 of Figure 20b.

In describing the drawings the usual convention of applying the same reference numeral to like parts in different forms of construction will be followed, distinctive indexes being added where necessary to distinguish between modified forms of the same basic part.

Figure 8:
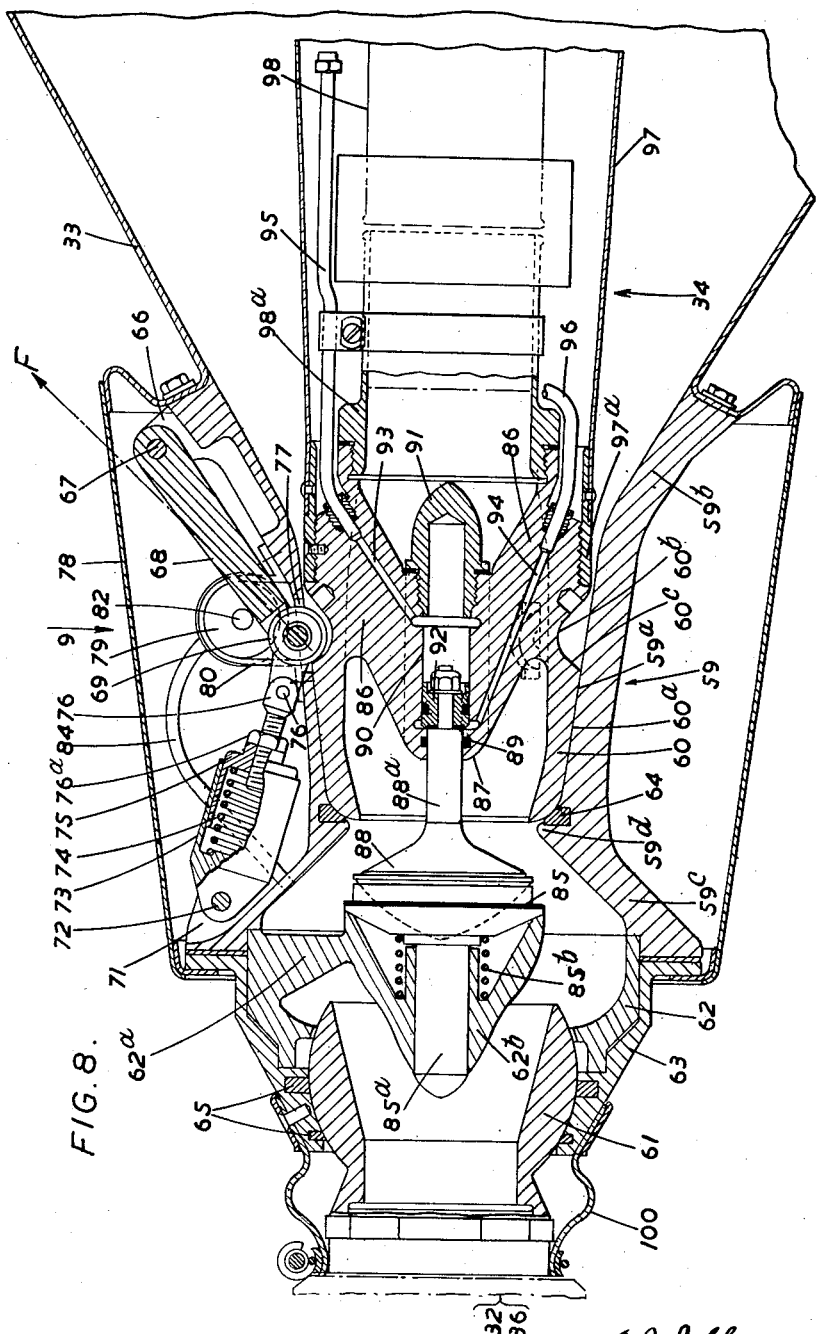
Figure 8 is a view on an enlarged scale, in axial section partly in elevation, of a preferred form of refuelling coupling between the element trailed by the leading aircraft and the rigid element extended from the following aircraft of Figures 1 to 4.

In Figure 1 a leading aircraft 30 is connected for refuelling and/or towing to a following aircraft 31 by means of a hose or hawser 32 trailed by the aircraft 30 and a rigid element or probe 34 extending forwardly from the nose of the following aircraft 31, the element 32 being caused to trail nearly horizontally by means of a drogue 33 mounted on its extremity. The hose or hawser 32 terminates in a socket (see Figures 8 and 9) provided with spring latches which engage a nozzle or spigot (see Figures 8 and 9) on the end of the probe 34. To establish connection the leading aircraft trails the element 32 and the following aircraft approaches from the rear so as to thrust the probe 34 into the socket on the end of the trailing element 32. The drogue 33 is of hollow conical form and constitutes a continuation of the mouth of the socket (see Figures 8 and 9) and thus serves to guide the nozzle or spigot end of the probe into the socket. On entering the socket the nozzle or spigot of the probe is engaged by latches and retained. The operation of the latch mechanism and the manner in which disengagement is effected is hereinafter described in connection with the structure of the socket and probe more particularly with reference to Figures 8 and 9.

In Figure 1 the element 32 is trailed from the underneath of the body of the aircraft 30 and the probe 34 is mounted on the nose of the aircraft 31.

Figure 2 shows an alternative position for the element 32, which, in this instance, is trailed from a wing tip of the aircraft 30, the probe 34 being likewise mounted on a wing tip of the aircraft 31 (shown in full lines). The chain dotted outline 31a indicates the position of the following aircraft when the probe 34 is mounted on the nose thereof, the element 32 being trailed from the wing tip of the leading aircraft.

Figures 3 and 4 illustrate an alternative form of construction of the element trailed by the leading aircraft 30. In this instance the trailing element comprises two sections of rigid rod or pipe 35 and 36, the inboard section 35 being suspended from the aircraft 30 on a joint permitting it to swing in a fore and aft direction, its rearward swing being limited to a position slightly beyond the vertical by means of a stop 38. The outboard section 36, which carries the drogue 33 and socket (not shown) at its extremity is connected to the inboard section 35 by means of a joint allowing it to swing vertically when extended in a trailing position by the drogue 33 and the jointed structure and hinged suspension enable the trailing element 35, 36 to be completely retracted within the fuselage of the aircraft 30 if the latter is deep enough. The outboard section 36 is also enabled to swing laterally, as shown in Figure 4, by means of a swivel joint near the inboard end of the section 35 (see Figures 5 and 6).

In Figures 3 and 4 the following aircraft 31 is shown in the approach position before the probe 34 enters the drogue 33 and socket on the outboard portion 36 of the trailing element, the position when contact has been established being indicated in chain dotted lines in Figure 3.

Figures 5 and 6 illustrate details of a suspension and swivelling joint structure for inboard element 35 adapted to serve as a refuelling pipe, which is connected through the joint structure to a fixed pipe 37 in the aircraft 31 (see also Figures 3 and 4).

The structure supporting the suspension joint comprises a pair of parallel plates 39, 40 interconnected by a web which constitutes the stop 38 previously referred to. The fixed pipe 37 terminates in an elbow which passes through an opening in the plate 39 and is flanged for connection by bolts 41 to the plate 39 and to a flange on one end of a transverse hollow member 42, whose other end is blind and is extended through a loose washer 43 and an opening in the plate 40, the extension being threaded to receive a clamping nut 44 by which it is secured to the plate 40. The member 42 has openings 45 communicating with the interior of a banjo 46 rotatably supported on the member 42, the joint between the parts 42 and 46 being sealed by means of sealing rings 47. The hollow neck 48 of the banjo 46 is externally threaded to receive an internally threaded retaining sleeve 49 internally shouldered at 49a to engage and retain the flanged end of an adaptor 50, which is screwed into the inboard end of the inboard section 35 of the hollow trailing element. The adaptor 50 meets the end of the banjo neck 48 on a face joint, the adaptor and pipe section 35 being free to rotate in the sleeve 49, so that the assembly of parts 48, 49, 50, 35 constitutes a swivel joint, which is sealed by a washer 51 and a sealing ring 52.

Figure 7 illustrates the joint connecting the inboard section 35 of a trailing pipe element with the outboard section 36 thereof. This joint comprises a hollow member 53 having a yoke portion 53a, a central neck 53b screwed onto the end of pipe section 35 and two coaxial banjos 53c, disposed one at each end of the yoke portion. The banjos 53c support coaxial hollow plugs 54, which are screwed into internally threaded extensions of the banjos and sealed with respect thereto by washers 55 and sealing rings 56. Openings 54a in the plugs 54 provide communication between the interiors of the plugs and of the banjos. The open ends of the plugs 54 extend inwardly from the banjos 53c and constitute trunnions on which the cross-head of a hollow T piece 57 can rotate, the joint being sealed by means of sealing rings 58 and the cross-head being axially located between the banjos. The stem of the T piece 57 is internally threaded to receive the threaded end of pipe section 36.

A preferred construction of the means by which a refuelling connection is made between a hollow probe 34 and a trailing hose 32 or pipe element 36 (see Figures 1 to 4) is illustrated in Figures 8 and 9.

The hose 32 or pipe element 36 is connected by means of a ball joint with a socket 59, 62, 63 of which the socket member 59 comprises a tapered throat 59a, a flared mouth 59b, of which the drogue 33, shaped as a rearward facing hollow cone, forms a unitary continuation and an inwardly expanding portion 59c separated from the throat by a constriction 59d.

The male member of the socket-connecting ball-joint is constituted by a spherical-ended adaptor 61 secured to the hose 32 or pipe section 36, and the female part of the joint is constituted by two members, 62, 63, internally shaped to a complementary female spherical form; the member 63 being a ring having a flanged skirt secured to the socket member 59 by studs 99 (Figure 9), and the member 62 being a spider member enclosed in the skirt of the ring 63 and retained thereby against a shoulder of the socket member 59. The complete socket is made in three parts 59, 62, 63 for ease of fabrication and assembly. The sealing and exclusion of dirt from the ball-joint is provided for by rings 65 recessed into the ring 63, which is also connected to the end of hose 32 or pipe-section 36 by a flexible gaiter 100.

The spider member 62 has integral radial webs 62a supporting an integral central boss 62b, which is axially bored to provide a sliding bearing for the stem 85a of a mushroom valve 85, which is loaded by a spring 85b to move outwardly and seat on the inner face of the constriction 59d of the socket member 59 to close the end of the hose 32 or pipe 35, 36.

On the mouth end of the socket member 59 are three external forked lugs 66. Each lug 66 carries a pivot pin 67, on which is pivotally supported a latch lever 68 having a slotted end carrying a roller 69 and a shackle pin 70. On the opposite end of the socket member 59 are three forked lugs 71 each carrying a pivot pin 72 on which is pivotally supported a cylindrical thimble 73 enclosing a compression spring 74 and a slidable plunger 75, the latter being connected by a threaded eye-stud 76 with the shackle pin 70. The relative disposition of the latch-levers 68 and spring-plunger assemblies 73—76 is such that the springs 74 load the latch-levers to move inwards and cause the rollers 69 to project into the interior of the throat 59a of the socket through slots 77, as will be evident from the drawing (Figure 8). The initial setting of spring 74 can be adjusted by screwing the eye-stud 76 into or out of the plunger 75, a lock-nut 76a being provided for locking the adjustment. An external fairing or shroud 78 of sheet metal encloses the latch mechanism 66—76.

In the example illustrated the socket is also provided with means for locking each of the latch-levers 68 in the position shown with the rollers 69 extending into the throat 59a through the slots 77. The locking means comprises a cylinder 79 secured to the socket member 59, e. g. by a strap 80 as shown, and a piston 81 slidable in the cylinder and having a piston rod 82 constituting a locking pin engageable with the outer face of the lever 68. Normally the pin 82 is withdrawn from the locking position by a light compression spring 83 enclosed in one end of the cylinder and acting on one face of the piston. The opposite end of the cylinder is connected by means of a duct 84 with the interior of the socket 59. When the hose 32 or pipe 35, 36 is loaded with fuel under pressure, the pressure is communicated to the piston 81 by the duct 84 to extend the locking pin 82 into the latch-lever-engaging position as shown in Figure 9.

The probe 34 extending forwardly from the following aircraft comprises a tube 98, which serves as the fuel pipe, terminating in an enlarged head 98a externally threaded for connection with an internal thread on the base of a nozzle 60, which is further provided with an external thread for connection to a sleeve 97a secured to the outboard end of a sheet metal outer probe tube 97.

The nozzle 60 comprises a tapered extremity 60a, shaped to fit into the throat 59a of the socket member 59 and engage with its tip a sealing ring 64 retained in an annular recess of the socket, and a circumferential groove 60b, in which the latch rollers 69 are resiliently engageable by the spring-plunger assemblies 73—76.

The nozzle 60 has integral radial webs 86 supporting an integral central boss 87, which is axially bored to provide a sliding bearing for the stem 88a of a mushroom valve 88 seating on the mouth of the nozzle and movable outwardly to leave its seating. The sliding joint is sealed by a sealing ring 89 recessed into the bore of the boss 87. This bore is enlarged at 90 to form the cylinder of a double-acting hydraulic jack, whose piston 92 is secured to the valve stem 88a. A screw plug 91 closes the inner end of cylinder 90, the opposite ends of which are respectively connected by galleries 93, 94, formed in the webs 86, with pipes 95, 96 which are led back into the aircraft within the outer probe tube 97, to a control valve 122 (see Fig. 8a) for reversing the connections of pipes 95, 96 with a hydraulic pressure line 123 and a return line 124, the valve 122 being provided with a hand lever 125.

With the nozzle inserted in the socket, as shown in Figure 8, when valve 88 is moved outwards by the hydraulic ram 90, 92 to leave its seating it engages the socket valve 85 and moves it inwardly off its seating on the constriction 59d against the effort of spring 85b, thus placing the hose 32 or pipe 35, 36 in fuel-transmitting communication with the interior of the inner probe-tube 98. If the nozzle should be pulled out of the socket before the probe valve 88 is brought back onto its seating to close the probe, the valve 85 will be automatically closed by the spring 85b.

The forward face 60c of the groove 60b is inclined at such an angle that the normal thereto at the point of contact with the roller 69, indicated by the chain-dotted arrow F in Figure 8, passes outside the pivot pin 67 so that when tension is transmitted from the socket to the probe through the latches 68, 69 the forces experienced by the latches, acting along the arrow F, exert moments about the latch pivots 67 tending to spring the rollers 69 out of the groove 60b and when the transmitted tension exceeds a critical limit the moment about the pivot 67 of force F will exceed that of the force exerted by spring 74 and the latch will yield and release the probe. Owing to the shallow taper of the nozzle extremity 60a the corresponding normal force when the rollers 69 are riding on the taper 60a has a much greater leverage about the pivot 67 and at the same time the axial component of the normal force is much less than when the rollers are engaged in the groove; and consequently the thrust which must be applied to the probe to spring the latches over the taper of the nozzle and into the groove is considerably less than the limiting tension transmissible through the latches.

When the apparatus is intended primarily for flight refuelling the strength of the springs 74 is so selected that the limiting tension transmissible through the latches is less than the normal drag of the following aircraft with dead motor(s) and the motors may be kept running at somewhat reduced power during refuelling to relieve the drag and prevent the nozzle from pulling out of the socket. Disconnection can then be effected merely by throttling the motor(s) of the following aircraft right down to increase the drag of the following aircraft to a figure at which the limiting tension transmissible by the latches is exceeded. In this case the latch-locking means 79—84 may be omitted.

If however, the apparatus is to be called on to tow the following aircraft before, during or after refuelling it, the limiting tension transmissible by the latches would have to be increased to a value greater than the normal drag of the following aircraft with dead motor(s) and consequently disconnection will call for putting on extra drag by means, e. g. of flap, dive-brake or undercarriage lowering.

This necessity is obviated by the latch-locking device 79—84 which keeps the latches positively engaged as long as the hose 32 or pipe 35, 36 is loaded with fuel under pressure, even if the valve 85 is allowed to close since the duct 84 opens into the socket at a point situated inwardly of the valve seating. As soon as the fuel pressure is relieved, e. g. by closing a fuel valve in the leading or tanker aircraft and venting the hose or pipe to atmosphere, the latch-locks are withdrawn and the drag of the towed aircraft pulls the nozzle out of the socket.

Figure 10:
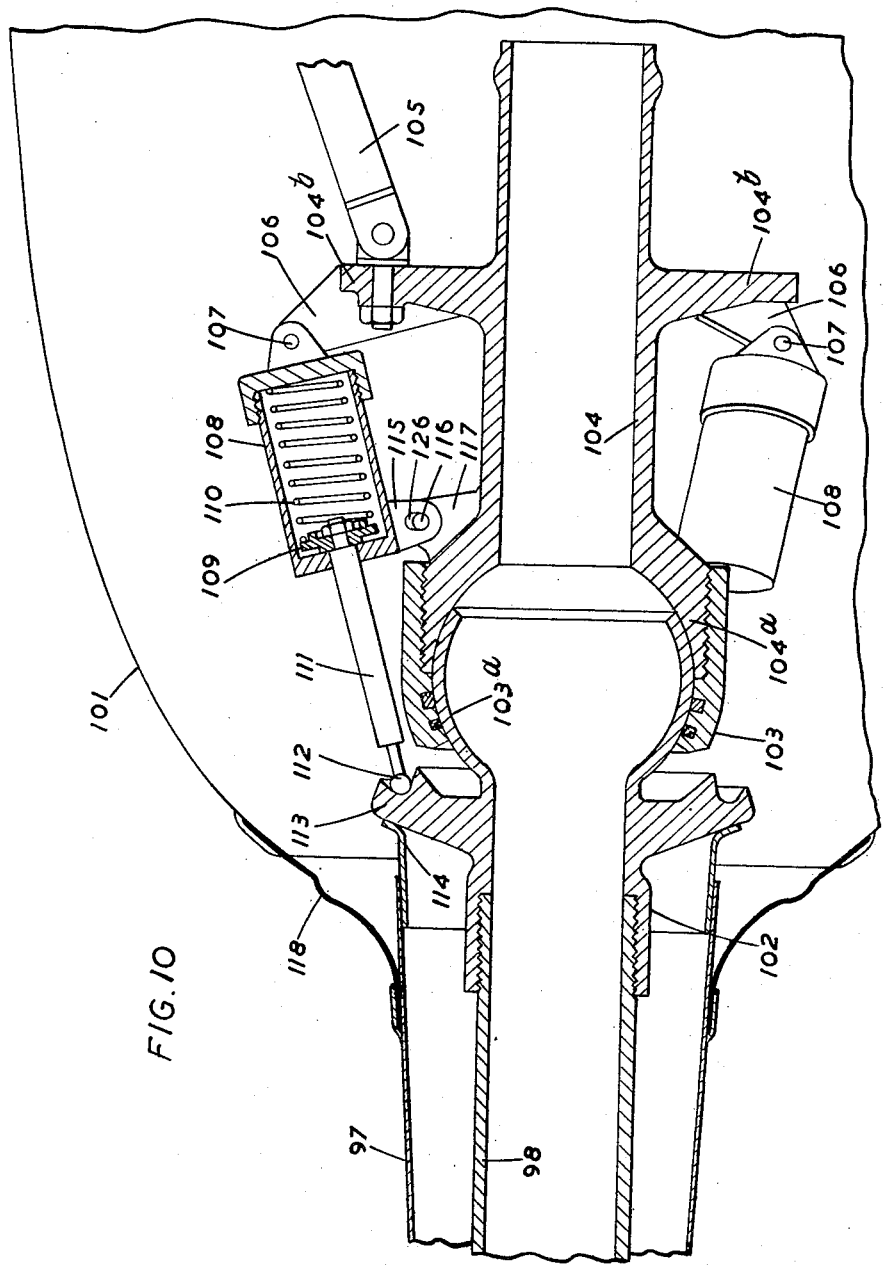
Figure 10 is a somewhat schematic axial section of a modified mounting of a rigid element or "probe" extending forwardly from the following aircraft of Figures 1 to 4.

In the forms of construction previously described the probe is rigidly mounted. To facilitate insertion of the probe into the socket, e. g. in gusty conditions when the extremity of the trailed element may swing violently, the probe may be mounted with some freedom to deflect as illustrated in Fig. 10.

In this form of construction, showing the mounting of the probe in the nose 101 of an aircraft, the inner probe-tube 98 is screwed into a sleeve 102 connected by a ball-joint with a fixed probe-mounting tube 104 having a flange 104b bolted to the fixed structure of the aircraft of which one member is indicated at 105.

The male member 102a of the ball-joint is an extension of the sleeve 102 and the female part is constituted by an enlarged head 104a of the tube 104 and a retaining sleeve 103 screwed onto the head 104a.

The probe is resiliently centred by spring plunger assemblies, each comprising a cylinder 108 pivotally supported at 107 on a bracket 106 extending from the flange 104b, a piston 109 sliding in the cylinder, a compression spring 110 enclosed in the cylinder and thrusting the piston outwards, and a piston rod 111 terminating in a ball 112 engaged in a recess formed in the inner face of a skirt 113 integral with the inner probe-tube 98. A short sleeve 114 attached to skirt 113 supports the outer probe-tube 97 which is connected to the skin of the aircraft-nose 101 by a flexible gaiter 118. The cylinder 108 is steadied against sideways deflection by a lug 115 extending from the cylinder, the lug being slotted at 126, to receive a pin 116 supported in a forked lug 117 integral with the tube 104, 104a.

Fig. 11 illustrates an arrangement alternative to that shown in Fig. 1, in which the socket 59 is mounted on the probe 34 extending from aircraft 31, and the nozzle or spigot 60 on the end of the element 32 trailed from aircraft 30. In this form of construction the element 32 may be rigid and may be telescopic or/and slidably retractable into the aircraft 30. The mouth of the socket 59 being extended by means of a hollow forward-facing cone or bell 121; this member performing the same function as the conical drogue 33 in the other embodiments described, namely, as a receptor of the cooperating nozzle element 60; the element 32 may be mounted in the aircraft by means of a ball and socket joint with spring-centring means of similar construction to the probe-mounting illustrated in and described with reference to Figure 10 hereof.

The probe structure of this modification is shown in more detail in Figure 12. The socket member 59 is similar in construction to that shown in Figures 8 and 9 and comprises a tapered throat 59a, a flared mouth 59b facing forwards and extended by the nozzle receiving cone 121, and an inner, inwardly flaring portion 59c separated from the throat by a constriction 59d. As before, the socket is slotted at 77 to admit the rollers 69 of a latching assembly 66—76 similar to that shown in Figures 8 and 9 and already described. The socket member 59 is connected rigidly to the inner probe-tube 98 by a hollow spider member 119 having an internal radial web 119a supporting a central boss 119b in which is slidable the stem 85a of a valve 85 loaded by a spring 85b to seat on the inner face of constriction 59d as in Figure 8. The spider member 119 also supports the outer end of the outer probe-tube 97 by means of a connecting sleeve 120. The probe is shown as mounted on the nose 101 of the aircraft 31.

A modification of the probe and socket connection for towing without refuelling is illustrated in Figure 13. In this case the socket 59, which comprises as before a tapered portion 59a and a flared mouth 59b extended by the conical drogue 33, is directly connected to a hawser 32x by means of a sleeve 128 swaged on the hawser and having an enlarged head 129. The probe tube 98 terminates in a threaded extension 98a screwed into a spigot 60x having a tapered extremity 60a and a circumferential groove 60b. As before the socket is slotted at 77 to accommodate latch-rollers 69 engageable with the spigot groove 60b and mounted on latch levers 68x, pivoted at 67x on lugs 66x near the inner end of the socket. In this instance the latch levers extend towards the mouth of the socket and are each loaded to cause the rollers to extend inwardly through the slot 77 by a spring plunger assembly 71x, 72x, 73x, 74x, 75x, 76x shackled to the latch lever 68x at 70x and corresponding to the assembly 71—76 of Figs. 8 and 9, but in which the spring 74x is situated on the side of the piston 75x remote from the anchorage 72x of the thimble 73x.

In this construction the latch levers 68x have extensions 127 carrying rollers 130, which project through slots 131 into a central bore 132 of the socket 59 extending inwards from the throat 59a.

Within the spigot 60x is formed a hydraulic or pneumatic cylinder 133 which is closed by a screw plug 134 and within which slides a piston 135 terminating in a locking bar 137 which extends through the end of the spigot and loaded by a spring 136 in the direction for withdrawing the locking bar 137. When extended, the bar 137 engages the rollers 130 and locks the latch-levers 68x in the position in which the rollers 69x engage the groove 60b. The inner end of cylinder 133 communicates through the plug 134 with a pipe 138 enclosed within the probe-tube 98; and pipe 138 is led to a cock 139 having an operating lever 140 by which cock the cylinder 133 can be connected either to the hydraulic or pneumatic pressure line 123 or to the return line 124 which is under atmospheric pressure (or vented to atmosphere).

When pressure is applied by pipe 138 to the inner face of piston 133 the piston is driven forward against the effort of spring 136 to cause the locking bar 137 to engage the rollers 130. Release of the pressure by connecting the pipe 138 through the cock 139 to the return line 114 enables the spring 136 to move the piston 133 inwards and withdraw the locking bar 137 from engagement with the rollers 130 and thus allows the latch-rollers 69x to be sprung out of the groove 60b.

It will be clearly understood from the nature of the invention as set forth in the present disclosure that in many cases where hollow connecting elements are provided for refueling purposes, towing connections could be substituted, and vice versa. For example, the towing coupling just described in connection with Figure 13 is adapted for ready application to the connecting devices illustrated in Figures 10, 11 and 12, as an optional feature of the present invention.

The winding gear of a hose or hawser 32 trailed by a leading aircraft is schematically illustrated in Fig. 14. The element 32, hereinafter referred to for brevity as a hose, carrying the drogue 33 at its end, is wound on a reel 141 which is driven in the direction for winding in the hose by a motor 142 through a gear pair 143, 144, a shaft 145, a fluid coupling 146, a second shaft 147, a sprocket 148, and an endless chain 149, which passes over a jockey sprocket 150 and a sprocket 151 on the reel 141.

By running the motor at reduced power, while the hose is being unreeled by the drag of the drogue and when the hose is fully extended, a continuous torque is applied to the reel tending to wind in the hose. As long as the drag of the drogue 33 applies a tension to the hose superior to that applied by the winding-in torque transmitted by the fluid coupling the hose will remain extended, but if the drag of the drogue is relieved by forward pressure exerted by the probe the torque applied through the fluid coupling will wind in the hose sufficiently to take up slack in it.

In Figures 4 to 6 the inboard end of the jointed trailing pipe 35, 36 is shown as connected to a fixed pipe 37 in the aircraft 30. Similarly the inboard end of the trailing hose or pipe 32 of Figures 1, 2, 8, 9, 11 and 14 will be connected to a fixed pipe (not shown). This pipe will normally be provided with a fuel cock for controlling the flow through the pipe and with an atmospheric vent controlled by a vent cock for venting the pipe when the fuel cock is closed.

Figure 15 illustrates a preferred arrangement in which both the fuel cock and vent cock are operated by an electromagnetic actuator so that when one is opened the other is closed and conversely. The cock and actuator assembly is mounted on a frame 152 which supports a fuel cock 153 in the run of pipe 37 and a vent cock 154 in the run of a pipe 155, one end of which is connected to the pipe 37 and the other is vented to atmosphere. The frame 152 also supports an electromagnetic actuator, of which the stationary part 156 is anchored to the frame by means of a shackle 158 and shackle pin 159, and the moving part 157 is connected by means of a pin 160 with a forked lever 161 clamped to a shaft 162 common to both cocks. Both cocks are standardized components, their operative elements being here schematically represented by butterflies 163, 164, both mounted on the shaft 162 and so disposed thereon that when the fuel cock 156 is closed the vent cock 154 is in the fully open position and conversely. The actuator 156, 157 is of a double-acting type the ends of its winding (not shown) being respectively connected to input leads 165, 166 and a central tapping from the winding being connected to a common return lead 167.

Figure 18:
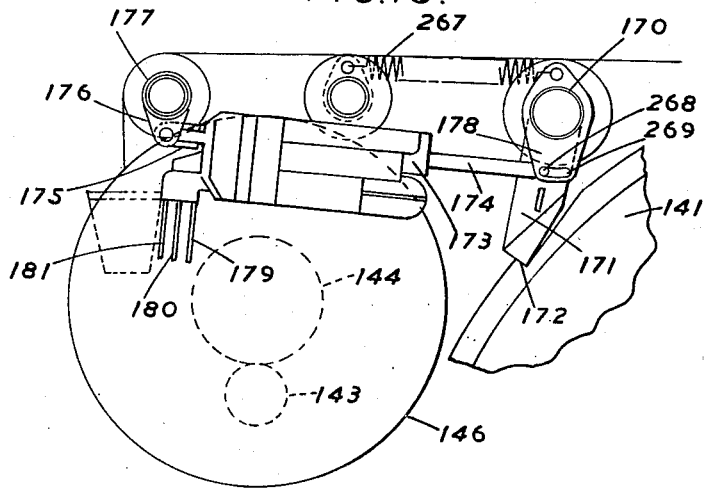
Figure 18 shows a detail of the winding gear in section on the line 18—18 of Figure 16.

A preferred form of construction of the winding gear schematically illustrated in Figure 14 is illustrated in greater detail in Figures 16 to 18. The winding gear is supported on a structure comprising side frame plates 168, 169 and comprises, in addition to the components 141—151 previously mentioned with reference to Figure 14, a transverse rocking bar 170 carrying stop pawls 171 engageable with ratchet teeth 172 in the rims of the reel 141, and a stop pawl actuator in the form of a double-acting electromagnetic ram 173, 174, of which the stationary part 173 is anchored by means of a shackle 175 to a bracket 176 on a transverse bar 177 of the frame, and the moving part 174 is connected to a lever 178 on the rocking bar 170. The actuator is of the same kind as the fuel and vent cock actuator illustrated in Figure 15, its electrical connections comprising input leads 179, 180 and a return lead 181. The lever 178 is loaded by a tension spring 267 in the direction for engaging the stop pawls 171 and it is connected to the moving part 174 of the actuator by means of a pin 268 and slot 269 enabling the pawls 171 to ratchet over the teeth 172 when the reel 141 is winding in the hose.

One end of the axle of the reel carries a lead screw 182 on which is threaded a nut 183 which is free to move axially and is longitudinally slotted at 184 for engagement by a spring-loaded plunger 185, and is thereby prevented from rotating. The spring plunger 185 is supported by a bracket plate 186 which also carries two microswitches 187, 188 provided with actuating levers 189, 190 engageable by the nut 183 as it travels outwards along the lead screw 182. Microswitch 187 controls the stop pawl actuator 173, 174 and microswitch 188 controls the fuel valve actuator 156, 157.

Figure 19:
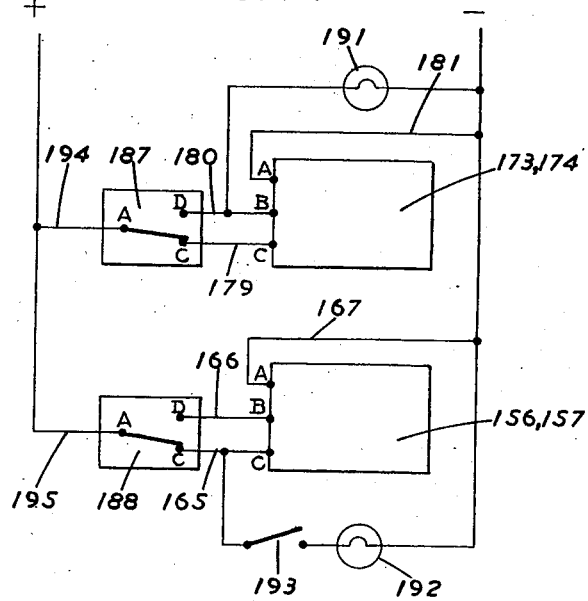
Figure 19 is a circuit diagram of the electrical connections of the winding gear of Figures 16 to 18 and the fuel and vent cock assembly of Figure 15.

In addition, the side frame plates 168, 169 carry lamps 191, 192 which are exposed so as to be visible by a following aircraft. Lamp 191 is electrically connected to the microswitch 187 and lamp 192 is electrically connected to the microswitch 188. The connection of the fuel cock and stop pawl actuators 156, 157 and 173, 174, the lamps 191, 192 and the microswitches 187, 188 are shown in the circuit diagram, Figure 19.

It will be seen that the input terminals A of both microswitches are connected by the leads 194 and 195 to the positive main marked + and that the output terminals D and C of the microswitch 187 are respectively connected to the input leads 179, 180 of the stop pawl actuator 173, 174. Similarly, the output terminals D and C of microswitch 188 are respectively connected to the input leads 165, 166 of the fuel cock actuator 156, 157. The terminal D of microswitch 187 carrying lead 180 is also connected through lamp 191 with the return main marked —, and the output terminal C of switch 188 carrying lead 165 is connected through an override switch 193 (which is normally kept closed) and lamp 192 to the return main to which the return leads 167, 181 of the fuel cock and stop pawl actuators are also connected.

When the nut 183 is disengaged from both microswitch actuating levers 189, 190 microswitch 187 is closed on the output terminal carrying lead 179 and the microswitch 188 is closed on the output terminal carrying lead 165. In this condition the stop pawl actuator is energised to hold the stop pawls clear of the ratchet teeth of the reel and the fuel cock actuator is energised to open the fuel cock and close the vent cock. At the same time the circuit through lamp 191 is open and this lamp is extinguished while the circuit through lamp 192 is closed (provided the switch 193 is closed) and this lamp is illuminated. Lamp 191 is preferably provided with a red glass and lamp 192 with a green glass. As the hose is paid out by the reel the nut 183 moves outwards along the lead screw 182 and when the hose is nearly fully paid out the nut engages the actuating lever 190 and throws over the microswitch 188 to close it on the output terminal carrying lead 166, thereby reversing the fuel cock actuator to close the fuel cock and open the vent cock, at the same time opening the circuit of lamp 192 so as to extinguish the latter. When the hose is fully paid out the nut 183 engages the actuating lever 189 and throws over microswitch 187 to close it on the output terminal carrying lead 180 to reverse the stop pawl actuator and extend the pawls 171 into engagement with the ratchet teeth 172 of the reel. This stops the hose from running right out, and, by transferring the function of resisting the tension of the hose to the stop pawls, relieves the motor 142 (which, as previously explained, is kept running at reduced power) and the transmission 143—151 of the load imposed by the hose tension. At the same time the circuit through lamp 191 is closed to illuminate this lamp.

When the drag imposed on the hose by the drogue 33 is relieved by forward thrust imparted by the probe carried by the following aircraft, the slack in the hose is taken up by the torque transmitted to the reel 141 through the fluid coupling 146 by the motor 142. The nut 183 thereupon moves back along the lead screw 182 and first disengages the actuating lever 189 of microswitch 187, thereby reversing the microswitch connections and causing the stop pawl actuator to withdraw the stop pawls from the ratchet teeth and extinguish the red lamp 191. When the end of the hose 32 carrying the drogue 33 has been moved forward relatively to the leading aircraft by the thrust of the probe carried by the following aircraft a short distance, e. g. about 4 ft., and this amount of slack in the hose has been taken up by the reel 141, the nut 183 has moved back far enough along the lead screw 182 to disengage the actuating lever 190 and reverse the connections of the microswitch 188 to open the fuel cock and illuminate green lamp 192. In this condition fuel can be passed from one aircraft to the other. If the following aircraft falls back beyond the critical position at which the nut 183 engages the actuating lever 190 of the microswitch 188 the fuel valve will close and the green lamp 192 will be extinguished. The extinction of lamp 192 warns the pilot of the following aircraft that he is losing station and must close in again and the closing of the fuel cock forestalls the possibility of the probe pulling out of the socket on the end of the trailing hose 32 while the fuel cock is still open. As already explained, the valve in the socket itself closes automatically when the probe pulls out of the socket so that in this event the fuel actually in the trailing hose 32 is not lost. This fuel can, of course, be recovered by reeling in the hose sufficiently to open the internal fuel cock 153 and pumping the fuel back into the tanks of the aircraft.

In the alternative form of apparatus illustrated in Figures 3 to 7, the pipe 37 may likewise be provided with a fuel cock and vent cock operated by an electromagnetic actuator as illustrated in Figure 15, the actuator being controlled by a microswitch 188 having an actuating lever 190 operated by a cam 46a formed on the banjo 46 as shown in Figure 6.

Figures 20 to 23 illustrate a retractable and extensible probe structure comprising a telescopic probe-tube, of which the outer tube 196 is supported in a two-part outer casing 197, 198 and located therein by a key 234, and is clamped at the rear in a clamp 199, the inner tube 200 being slidable in the outer tube and supported therein at the rear end by a bearing 201, located between a Circlip 202 and a bearing locking ring 203 and furnished with sealing rings 204; while the forward end of the inner tube 200 is secured to the nozzle 60 by means of a nozzle connector 234 screwed onto the inner tube 200 and a nozzle locking ring 232, the joint being sealed by sealing rings 233, and slides in a bearing sleeve 205 secured to the outer tube 196 and furnished with a sealing ring 206. For lubrication of the front bearing an external nipple 207 is provided.

The outer casing members 197, 198 are provided with external lugs 197a, 198a and 198b by which the assembly can be secured to the fixed structure of the aircraft (not shown). In the rear end of the outer tube 196 is inserted a flanged sleeve 208 provided with sealing rings 209 which seal against the outer tube, a sealing ring 210 which seals against the locking ring 203 when the inner tube 200 is fully retracted, and a sealing ring 211, which seals the joint between the flanged sleeve 208 and the aircraft's fuel system (not shown) to which sleeve 208 is connected.

Extension and retraction of the inner tube 200 is effected by means of a double-acting pneumatic ram 212, a toothed rack 213, a pinion 214 engaged with the rack, a chain-sprocket 215, and a length of chain 216 engaged with the sprocket. The stationary member of the ram 212 is connected to an elongated ram support block 217 secured to the outer tube 196 by straps 218 and having an integral fork 217a connected to a fork 212a on the end of the stationary member of the ram by means of a shackle 219, studs 220 and a pin 221. Into the extending end of the movable member of the ram 212 is screwed and riveted a piston 222, which slides in a guide formed in the outer casing member 198 and is bolted to one end of the rack 213. The other end of the rack, which is housed in the outer casing member 198, slides between guide faces formed on the casing members 197, 198, the guide face of the latter being extended rearwardly by a rack-guide 223 bolted to member 198. Pinion 214 and sprocket 215 are keyed to a common shaft 224 rotatably supported by the outer casing 197, 198; and the chain 216 is located in a longitudinal recess of a chain guide 225 and attached thereto at each end, the chain guide being secured to the underside of the inner tube 200.

For positively locking the inner tube-extending and -retracting mechanism against extension a rack-stop is provided comprising a stop tooth 226 pivoted at 227 in the housing 228 of a stop-tooth-actuating pneumatic ram secured to the under side of the outer casing member 198 and comprising a differential piston 242, a stop tooth-engaging spring 243 acting on the under side of piston 242, an extension rod of which engages the stop tooth, a pneumatic connection 244 to the upper side of the piston and a pneumatic connection 245 to the lower side of the piston, which is of smaller area than the upper side, so that when both sides of the piston are subjected to the pneumatic pressure the piston experiences a downward force great enough to overcome the effort of spring 243 and withdraw the piston from the stop tooth 226, enabling the latter to disengage from the rack 213. When the lower side of the piston alone is subjected to pneumatic pressure the pressure assists the spring in holding the stop tooth in engagement with the rack. The rear face of the stop tooth is inclined at the same angle as the rack tooth faces so that when the tooth is engaged the rack cannot move forward, but the front face of the stop tooth has a lower inclination so that it only makes contact with the tips of the rack teeth enabling the rack to move rearwardly by ratcheting over the stop tooth which is engaged by spring and pneumatic pressure and can yield resiliently.

The pneumatic rams 212 and 228 are controlled by an electrically operated valve 229 mounted on an attachment plate 230 secured to the underside of the outer casing member 198.

A ring casing 235 is screwed onto the end of the outer tube 196 and is provided with sealing rings 236, 237, which seal on the nozzle connector 231 when the inner tube 200 is retracted, enclosing between them an annular space, which communicates through a gallery 238 in the ring casing with an external pneumatic pipe 239 connected to an electrically operated pneumatic valve 241 mounted on the attachment plate 230. This annular space also communicates through a gallery 240 in the ring casing and gallery 93 in the nozzle 60 with a pneumatic ram (not shown) corresponding to the hydraulic ram 90—92 of Figure 8 and operating a nozzle valve 88 (see also Figure 8), but in this instance the ram is single-acting as in Figure 13, the closure of the valve being effected by a spring (not shown) corresponding to spring 136 of Figure 13. It will be noted that pneumatic pressure can only be applied to the ram to open the valve when the inner tube is fully retracted to bring the nozzle-connector 231 into the ring casing 235.

Valve 229 has four pneumatic connections 246—249 and valve 241 has two pneumatic connections 250, 251 and an internal atmospheric vent. Pneumatic pressure is supplied by a pipe 252, which is connected by T-pieces 264, 265 and branches 253, 254, 255 respectively with the connections 250, 246 of the valves 229 and 241 and the connection 245 of the rack stop 228. Connection 247 of valve 229 is vented to atmosphere, connection 248 is connected by a pipe 256 with the front end of the ram 212, and connection 249 is connected by a pipe 257, a T-piece 266 and branches 257a, 257b with the rear end of ram 212 and with connection 244 of the rack stop. Connection 251 of valve 241 is connected by pipe 239 to the nozzle valve-opening ram.

Valves 229 and 241 are standardised components and their internal mechanism is therefore not illustrated. Both are two-position valves operated by single-acting solenoids with spring return, controlled by a single circuit. In the example illustrated the electrical wiring is on the two-pole system; consequently each valve has two leads 258, 259 and 260, 261 respectively. Leads 258, 260 are connected to the service mains through switches 262, 263 respectively (shown diagrammatically in Figures 20 and 22).

It will be seen that connection 245 of the rack stop 228 is always connected to the pressure supply pipe 252 by pipe 255 and consequently the underside of piston 242 is always subjected to the line pressure.

When switch 262 is open the valve 229 is in the position in which connection 248 communicates with connection 246 and connection 249 with connection 247, so that the line pressure is applied to the front end of the ram 212 by pipes 252, 254, 256, while the rear end of ram 212 and the upper side of piston 242 are vented to atmosphere through pipes 257a, 257b and 257 and vent 247. The outer tube 200 is therefore retracted and the stop tooth 226 engaged with the rack 213. When the solenoid of valve 229 is energised by closing switch 262, the connections are reversed so that connection 248 is vented to atmosphere through vent 247 and connection 246 communicates with connection 249, so that the rear end of the ram 212 and the upper side of piston 242 are subjected to the line pressure and the front end of ram 212 is vented to atmosphere. The stop tooth is therefore released from engagement with the rack and the inner tube 200 is extruded or "ejected." On re-opening switch 262 the action of the ram 212 is reversed to retract the inner tube again and the stop tooth 226 is extended to engage the rack 213, but the latter ratchets over the stop tooth in the retracting movement as already mentioned.

When switch 263 is open the valve 241 is in the position in which connection 250 is closed and connection 251 is vented. The nozzle valve 88 is therefore closed by its spring. On closing switch 263, with the inner tube 200 fully retracted so that the nozzle connector 231 is engaged in the ring casing 235, the solenoid of valve 241 is energised to put connections 250, 251 into mutual communication and close the vent, thus applying the line pressure through pipes 252, 253, 239 to the pneumatic ram in the nozzle 60 to open the nozzle valve 88.

The operating technique is for the following aircraft to approach with the probe in the retracted position until the nozzle 60 is within a few feet of the socket on the end of the hose or pipe trailed by the leading aircraft, whereupon the pilot of the following aircraft closes switch 262 to "eject" the probe inner tube 200 and thrust the nozzle into the socket; and when the latches have closed into the nozzle groove to retain the nozzle in the socket the pilot of the following aircraft closes the leading aircraft, at the same time opening switch 262 to retract the inner tube 200 and engage the rack stop to lock the inner tube and nozzle in the fully retracted position. Switch 263 is then closed to open the nozzle valve 88 and thereby open the socket valve 85 (Figure 8) as previously explained.

We claim:

1. For transferring a liquid from an aircraft to another in flight, apparatus comprising in combination a hollow, liquid-conveying element extended rearwardly from the first aircraft, a hollow, rigid, liquid-conveying element extended forwardly from the second aircraft, a tapered nozzle on the end of one of the elements having an external circumferential groove, a socket adapted to receive the nozzle on the end of the other element and terminating inwardly in a throat communicating with the interior of the element on which it is mounted, spring-loaded latches mounted on the socket for resiliently engaging the groove of the nozzle when the latter enters the socket, a first valve member axially movable in the socket, spring means urging said valve member outwardly to close the throat of the socket, a second valve member axially movable in the nozzle between a retracted position in which it closes the nozzle and an extended position in which it opens the nozzle and, when the nozzle is inserted in the socket, engages the first valve member and moves it inwardly of the socket to open the throat thereof, a valve actuator in the nozzle operative on the second valve member, and remote control means for said actuator operable by a crew-member of one of the aircraft.

2. Apparatus for transferring a liquid from one aircraft to another in flight, said apparatus comprising, in combination, a relatively long, hollow liquid-conveying pipe extended rearwardly from one of the aircraft, said pipe being relatively movable with respect to said aircraft, and means operatively connected with said pipe for ensuring that the terminal portion of said pipe trails rearwardly from the aircraft and yieldingly resists externally applied pressure acting forwardly in the line of flight of said aircraft, and a relatively short pipe extending forwardly from the other aircraft substantially in the line of flight of such aircraft, mutually cooperative plug- and socket-coupling members one of which forms the termination of the rearwardly extended pipe of the first mentioned aircraft and the other the termination of the forwardly extended pipe of the other aircraft, the plug-member being constituted by a hollow tapered nozzle and the socket-member having a narrow throat communicating with the interior of the pipe whose termination it forms and a flared mouth adapted to receive the tapered nozzle and guide it into said throat, self-engaging latching means adapted to couple said plug- and socket-members together upon said members being forcibly brought into cooperative relationship by relative movement of said members in the axial direction thereof, said latching means also adapted to release the plug-member from the socket-member when such members, being coupled, are subjected to an axial tension exceeding a critical value, a normally spring-closed valve in one of said members, a second normally closed valve in the other of said members, means for opening said second named normally closed valve, and means positioning said valves with respect to each other when said plug- and socket-members are in coupled relationship so that when the second named valve is opened it contacts and opens said first named valve, and when said second named valve is closed it permits said first named valve to be spring-closed.

3. Apparatus for coupling and uncoupling two aircraft in flight as defined in claim 10, in which the rearwardly facing element comprises an elongated rigid member hingedly suspended from the leading aircraft about a horizontal transverse axis, a stop limiting the rearward swing of the member on its hinge at a position slightly beyond the vertical, a second elongated rigid member hingedly connected to the end of the first elongated member about a transverse horizontal axis, an articulation between said two members enabling the extremity of the second member to swing laterally, one of the coupling assembly parts being carried by said extremity, said elongated rigid members being hollow to constitute a liquid-conveying connection, said apparatus including a cam on said first-named elongated rigid member, a stop-valve controlling the supply of liquid to said elongated rigid members, an electro-magnetic valve-actuator, and a switch controlling said actuator and operated by said cam to cause the actuator to close said valve when the first-named elongated rigid member in its rearward swing reaches a position slightly short of said stop and to maintain the valve closed until said first-named elongated rigid member reaches said stop, whereby the second-mentioned elongated, rigid member must be moved slightly forward from its extreme rearward position to enable the actuator to open the valve.

4. In an aircraft, flight refuelling apparatus comprising a trailable, flexible pipe, means supporting said pipe on said aircraft and for extending and retracting said pipe, a drogue for tensioning said pipe when extended and causing it to trail rearwardly of the aircraft and to offer yielding resistance to forward thrust applied externally to its trailing extremity, a fixed pipe system within the aircraft, a connection between said fixed pipe system and said flexible pipe, such connection including a stop-valve, an electromagnetic valve actuator, a switch controlling said valve actuator; actuating means for said switch responsive to the extension of said flexible pipe beyond a predetermined point near its limit of extension to actuate said switch to cause the valve actuator to close the stop valve, and responsive to retraction of said pipe beyond substantially the same point to cause the valve actuator to reopen said stop valve, whereby the flexible pipe must be slightly retracted from its full extension to enable the actuator to open the valve.

5. In an aircraft, apparatus for making connection with another aircraft in flight comprising a trailable, flexible connecting element, a reel for mounting said element for extension and retraction, a drogue for tensioning said element when extended and causing it to trail rearwardly from said aircraft and to offer yielding resistance to forward thrust applied externally to its trailing extremity, a ratchet wheel on said reel, a stop-pawl engageable with said ratchet wheel, an electro-magnetic stop-pawl actuator, a switch controlling said actuator and actuating means for said switch responsive to the approach of the flexible pipe to full extension for operating said switch to cause the pawl-actuator to engage the stop-pawl with the ratchet wheel when said flexible element is substantially fully extended.

6. The combination as defined in claim 2, including a locking member movable from an inoperative position to an obstructing position in which said locking member prevents said spring-loaded latching means from yielding resiliently and releasing the plug-member from the socket-member, spring means tending to move said locking member to inoperative position, a hydraulic actuator for moving said locking member to obstructing position and a connection from said hydraulic actuator to the interior of the socket-member ensuring that when said socket-member is loaded with liquid under pressure the hydraulic actuator is subjected to said pressure to cause the locking member to move to obstructing position.

7. In an aircraft, apparatus for making and breaking connection with another aircraft in flight for the purpose of transferring liquid from one aircraft to the other, said apparatus including a pipe extensible from said aircraft, a socket-member of a plug and socket coupling on the end of said pipe, a spring-loaded latching member mounted on said socket-member and engageable by said spring-loading with the plug-member of said coupling, which is mounted on the aircraft with which connection is to be effected, and disengageable therefrom when said coupling is subjected to tension overpowering the spring loading, a locking member carried by said socket member and movable from an inoperative position to an operative position in which it obstructs the withdrawal of said latching member, spring means tending to move said locking member to inoperative position, a hydraulic actuator, and a connection from the interior of the socket-member to the hydraulic actuator for communicating to said actuator the pressure of the liquid in said pipe and socket member which is to be transferred, whereby the locking member effectively prevents the release of said coupling member when there is liquid under supply pressure in said pipe and socket member.

8. Apparatus for establishing towing connection between one aircraft and another in flight, said apparatus comprising, in combination, a relatively long, connecting element extended rearwardly from one of the aircraft, said element being effectively flexible, and means operatively connected with said element for ensuring that the terminal portion of said element trails rearwardly from said aircraft and yieldingly resists externally applied pressure acting forwardly in the line of flight of said aircraft, and a relatively short rigid connecting element extended forwardly from the other aircraft substantially in the line of flight of such aircraft, mutually cooperative plug- and socket-coupling members one of which forms the termination of the rearwardly extended element of the first mentioned aircraft and the other the termination of the forwardly extended element of the other aircraft, the plug coupling part having a gradually tapering peripheral surface from its extremity inwardly thereof and an external circumferential groove of rounded cross section adjacent to and immediately inboard of said tapering surface, and the socket coupling part having a tapered throat the interior surface of which is of a complementary taper to the tapered plug surface which is received therein, and a flaring mouth portion extending in the outboard direction from said throat, at least one latch lever pivoted on said socket part at a point disposed radially outwardly of said plug part and spaced axially from the position of said groove when the coupling is effected, for swinging movement in a plane containing the axis of the socket part toward and from said plug part, spring means tending to press said lever inwardly toward said plug part, a roller mounted upon the free end of said lever and adapted to contact and bear against the tapering surface of said plug part during relative movement of the parts toward coupled position and against an inner margin of said groove when the coupling is effected, the length of said lever being greater than the radial distance from its pivot point on the socket part to the surface of the plug part, the stated position of the lever pivot and the stated length of the lever providing that during the entry of the complementary tapering surface of the plug part into the socket part, the force between it and said roller normal to said surface exerts a greater leverage about the pivot point of said lever, and the component of said normal force parallel to the axis of symmetry of the socket part is proportionally less, when said roller is in contact with the tapering surface of the plug part than when said roller is engaged in said groove and in contact therewith near said margin, said normal force always acting on said lever in a sense opposed to the tendency of said spring means to press said lever inwardly, a locking member mounted in said plug-member for axial sliding therein between an inoperative position and an operative position, in which it engages said latching member when the plug- and socket-members are coupled together and obstructs it so as to prevent it from yielding resiliently to release the plug-member, and remotely controllable means for moving said locking member to and from operative position.

9. The combination as defined in claim 8, in which the means for moving the said locking member comprise an actuator operated by fluid pressure.

10. Apparatus for coupling and uncoupling two aircraft in flight comprising an effectively flexible element facing rearwardly from one aircraft, a rigid element facing forwardly from the other aircraft and a coupling assembly comprising a plug part and a socket part, of which coupling assembly one part is mounted on the extremity of the said rearwardly facing element with its axis substantially in the line of flight of the aircraft from which such element faces rearwardly, the other coupling part being mounted on the extremity of said forwardly facing element with its axis substantially in the line of flight of the aircraft from which such element faces forwardly, the plug coupling part having a gradually tapering peripheral surface from its extremity inwardly thereof and an external circumferential groove of rounded cross-section adjacent to and immediately in-board of said tapering surface, and the socket coupling part having a tapered throat the interior surface of which is of a complementary taper to the tapered plug surface which is received therein, and a flaring mouth portion extending in the outboard direction from said throat, at least one latch lever pivoted on said socket part at a point disposed radially outwardly of said plug part and spaced axially from the position of said groove when the coupling is effected, for swinging movement in a plane containing the axis of the socket part toward and from said plug part, spring means tending to press said lever inwardly toward said plug part, a roller mounted upon the free end of said lever and adapted to contact and bear against the tapering surface of said plug part during relative movement of the parts toward coupled position and against an inner margin of said groove when the coupling is effected, the length of said lever being greater than the radial distance from its pivot point on the socket part to the surface of the plug part, the stated position of the lever pivot and the stated length of the lever providing that, during the entry of the complementary tapering surface of the plug part into the socket part, the force between it and said roller normal to said surface exerts a greater leverage about the pivot point of said lever, and the component of said normal force parallel to the axis of symmetry of the socket part is proportionally less, when said roller is in contact with the tapering surface of the plug part than when said roller is engaged in said groove and in contact therewith near said margin, said normal force always acting on said lever in a sense opposed to the tendency of said spring means to press said lever inwardly.

11. Apparatus for coupling and uncoupling two aircraft in flight comprising an effectively flexible element facing rearwardly from one aircraft, a rigid element facing forwardly from the other aircraft and a coupling assembly comprising a plug part and a socket part, of which coupling assembly one part is mounted on the extremity of the said rearwardly facing element with its axis substantially in the line of flight of the aircraft from which such element faces rearwardly, the other coupling part being mounted on the extremity of said forwardly facing element with its axis substantially in the line of flight of the aircraft from which such element faces forwardly, the plug coupling part having a gradually tapering peripheral surface from its extremity inwardly thereof and an external circumferential groove of rounded cross section adjacent to and immediately inboard of said tapering surface, and the socket coupling part having a tapered throat the interior surface of which is of a complementary taper to the tapered plug surface which is received therein, and a flaring mouth portion extending in the outboard direction from said throat, at least one latch lever pivoted on said socket part at a point disposed radially outwardly of said plug part and spaced axially from the position of said groove when the coupling is effected, for swinging movement in a plane containing the axis of the socket part toward and from said plug part, spring means tending to press said lever inwardly toward said plug part, a roller mounted upon the free end of said lever and adapted to contact and bear against the tapering surface of said plug part during relative movement of the parts toward coupled position and against an inner margin of said groove when the coupling is effected, the length of said lever being greater than the radial distance from its pivot point on the socket part to the surface of the plug part, the stated position of the lever pivot and the stated length of the lever providing that when the complementary tapering surface of the plug part and tapering throat of the socket part are mutually in register the said roller registers with and is caused by said spring means to enter the groove of the plug part, latch lever locking means including a locking member movable between an inoperative position and an operative position, in which it positively obstructs the latch levers from being moved to release said roller from the groove of the plug part of the coupling, spring means for moving said locking member from operative to inoperative position, and fluid-pressure actuated means for moving said locking member from inoperative to operative position.

12. Apparatus for coupling and uncoupling two aircraft in flight as defined in claim 10, in which said rearwardly facing element trails freely from the first aircraft and is provided adjacent its attached coupling part with a drogue device for stabilizing its flight to facilitate the entry of the tapering portions of the two coupling parts one within the other.

13. Apparatus for coupling and uncoupling two aircraft in flight as defined in claim 10, in which the rearwardly facing element is fully flexible and comprises a strand-like or filamentary trailing portion to which its associated coupling part is attached; in which a drogue device is applied to said trailing element adjacent said coupling part for stabilizing its trailing flight to facilitate coupling and uncoupling, and in which there is provided within the first aircraft a reel to which said trailing element is secured and upon which it is adapted to be wound, and a motor for actuating said reel.

14. Apparatus for coupling and uncoupling two aircraft in flight as defined in claim 10, in which the rearwardly facing element comprises a first rigid part pivotally connected to the aircraft about a transverse axis for fore and aft swinging and extending downwardly therefrom, a second rigid part pivotally connected to the first rigid part for upward and downward swinging and for lateral swinging and extending rearwardly therefrom and stop means limiting rearward swing of the first rigid part at a position slightly aft of the vertical.

15. Apparatus for coupling and uncoupling two aircraft in flight as defined in claim 10, in which the rearwardly facing element comprises a first rigid part pivotally connected to the aircraft about a transverse axis for fore and aft swinging and extending downwardly therefrom, a second rigid elongated part pivotally connected to the first rigid part for upward and downward swinging and for lateral swinging and extending rearwardly therefrom and stop means limiting rearward swing of the first rigid part at a position slightly aft of the vertical, and a drag creating device carried by said second rigid elongated part to cause it to trail rearwardly from the aircraft to which it is attached in flight.

16. Apparatus for coupling and uncoupling two aircraft in flight as defined in claim 10, in which the rearwardly facing element is rigid and of telescopic construction and is pivotally mounted on the aircraft for limited upward and downward and lateral swinging, and including spring means for centering said rigid element in a rearwardly extended position approaching the horizontal.

17. Apparatus for coupling and uncoupling two aircraft in flight as defined in claim 10, the rearwardly and forwardly facing elements being hollow for transference of fluid, and the respective socket and plug parts of the coupling being likewise hollow and having valves therein controlling flow of fluid therethrough, means for positively and selectively actuating one of said valves to opened and closed positions, means positioning the valves of the two parts relatively to each other when the parts are in coupled position for mutual cooperation whereby the opening of said first named positively actuated valve causes the other valve to open and the closing of said first named valve permits the other valve to close, means on the part which carries said other valve automatically closing said other valve when said coupling parts are separated.

18. Apparatus for coupling and uncoupling two aircraft in flight as defined in claim 10 in which the rearwardly and forwardly facing elements are hollow for the transfer of fluid, and the socket and plug parts of the coupling are also hollow, the apparatus further including a fluid conduit in that aircraft from which the effectively flexible element faces rearwardly, said conduit communicating with the interior of said rearwardly facing element, a valve in said conduit, a valve actuator, means mounting said rearwardly facing element for extension and retraction in the aircraft by which it is carried, means responsive to the extension of said rearwardly facing element beyond a predetermined amount to operate said actuator to close said last named valve.

19. Apparatus for coupling and uncoupling two aircraft in flight as defined in claim 10 in which the rearwardly and forwardly facing elements are hollow for the transfer of fluid, and the socket and plug parts of the coupling are also hollow, the apparatus further including a fluid conduit in that aircraft from which the effectively flexible element faces rearwardly, said conduit communicating with the interior of said rearwardly facing element, a valve in said conduit, a valve actuator, means mounting said rearwardly facing element for extension and retraction in the aircraft by which it is carried, means responsive to the extension of said last named element to control said actuator and thereby close said last named valve when the extension of the element exceeds a predetermined amount which is nearly to the point of full extension of said element, and means responsive to the retraction of said element for a predetermined amount from said full extension point, to open said valve.

20. Apparatus for coupling and uncoupling two aircraft in flight as defined in claim 10, in which said forwardly facing element on said second aircraft extends forwardly from the aircraft and there are provided means mounting said forwardly extending element on said second aircraft for resiliently yielding upwardly and downwardly and laterally within a limited range of deflection, said mounting means including a universal joint and spring means for urging said rigid extended element toward its normal position in line of flight.

21. Apparatus for coupling and uncoupling two aircraft in flight as defined in claim 10, in which said forwardly facing element on said second aircraft extends forwardly from the aircraft, the forwardly extended element being of telescopic construction, and said apparatus further including fluid-pressure-actuated means for extending and shortening the forwardly extended element.

22. Apparatus for coupling and uncoupling two aircraft in flight as defined in claim 10, in which said forwardly facing element on said second aircraft extends forwardly from the aircraft and there are provided telescopic mounting means for said forwardly extended element, a power device for effecting retraction and extension of said mounting means, and remote control connections for said power device operable by a crew member of the second named aircraft.

23. Apparatus for coupling and uncoupling two aircraft in flight as defined in claim 11, in which means are provided for slidably mounting the latch locking member in the plug part of the coupling, and extensions are provided on said latch levers engageable by said latch locking member when the coupling parts are in full mutual engagement.

24. In an aircraft, apparatus for making connection with another aircraft in flight comprising a trailable, flexible connecting element, a reel for mounting said element for extension and retraction, a drogue for tensioning said element when extended and causing it to trail rearwardly from said aircraft and to offer yielding resistance to forward thrust applied externally to its trailing extremity, a ratchet wheel on said reel, a stop-pawl engageable with said ratchet wheel, an electro-magnetic stop-pawl actuator, a switch controlling said actuator and means including a device responsive to the extension of said flexible element, said device comprising a lead-screw rotatable in accordance with the rotation of said reel in winding and unwinding directions, a nut threaded upon said lead-screw, means for holding said nut against rotation whereby the rotation of said lead-screw causes said nut to move axially, and contact elements of said switch actuated by said nut to operate said switch to cause the actuator to engage the stop-pawl with the ratchet wheel when said flexible element is fully extended.

25. A coupling device as for use in coupling and uncoupling aircraft in flight, said device comprising, in combination, a plug part and a socket part, the plug coupling part having a gradually tapering peripheral surface from its extremity inwardly thereof and an external circumferential groove of rounded cross-section adjacent to and immediately inboard of said tapering surface, and the socket coupling part having a tapered throat the interior surface of which is of a complementary taper to the tapered plug surface which is received therein, and a flaring mouth portion extending in the outboard direction from said throat, at least one latch lever pivoted on said socket part at a point disposed radially outwardly of said plug part and spaced axially from the position of said groove when the coupling is effected, for swinging movement in a plane containing the axis of the socket part toward and from said plug part, spring means tending to press said lever inwardly toward said plug part, a roller mounted upon the free end of said lever and adapted to contact and bear against the tapering surface of said plug part during relative movement of the parts toward coupled position and against an inner margin of said groove when the coupling is effected, the length of said lever being greater than the radial distance from its pivot point on the socket part to the surface of the plug part, the stated position of the lever pivot and the stated length of the lever providing that, during the entry of the complementary tapering surface of the plug part into the socket part, the force between it and said roller normal to said surface exerts a greater leverage about the pivot point of said lever, and the component of said normal force parallel to the axis of symmetry of the socket part is proportionally less, when said roller is in contact with the tapering surface of the plug part than when said roller is engaged in said groove and in contact therewith near said margin, said normal forces always acting on said lever in a sense opposed to the tendency of said spring means to press said lever inwardly.

26. A coupling device as for use in coupling and uncoupling aircraft in flight, said device comprising, in combination, a plug part and a socket part, the plug coupling part having a gradually tapering peripheral surface from its extremity inwardly thereof and an external circumferential groove of rounded cross section adjacent to and immediately inboard of said tapering surface, and the socket coupling part having a tapered throat the interior surface of which is of a complementary taper to the tapered plug surface which is received therein, and a flaring mouth portion extending in the outboard direction from said throat, at least one latch lever pivoted on said socket part at a point disposed radially outwardly of said plug part and spaced axially from the position of said groove when the coupling is effected, for swinging movement in a plane containing the axis of the socket part toward and from said plug part, spring means tending to press said lever inwardly toward said plug part, a roller mounted upon the free end of said lever and adapted to contact and bear against the tapering surface of said plug part during relative movement of the parts toward coupled position and against an inner margin of said groove when the coupling is effected, the length of said lever being greater than the radial distance from its pivot point on the socket part to the surface of the plug part, the stated position of the lever pivot and the stated length of the lever providing that when the complementary tapering surface of the plug part and tapering throat of the socket part are mutually in register the said roller registers with and is caused by said spring means to enter the groove of the plug part, latch lever locking means including a locking member movable between an inoperative position and an operative position, in which it positively obstructs the latch levers from being moved to release said roller from the groove of the plug part of the coupling, spring means for moving said locking member from operative to inoperative position, and fluid-pressure actuated means for moving said locking member from inoperative to operative position.

27. Apparatus for coupling and uncoupling two aircraft in flight comprising an effectively flexible element facing rearwardly from one aircraft, a rigid element facing forwardly from the other aircraft and a coupling assembly comprising a plug part and a socket part, of which coupling assembly one part is mounted on the extremity of the said rearwardly facing element with its axis substantially in the line of flight of the aircraft from which such element faces rearwardly, the other coupling part being mounted on the extremity of said forwardly facing element with its axis substantially in the line of flight of the aircraft from which such element faces forwardly; said coupling assembly further including latching means, spring means for moving said latching means towards a latching position in which it is operative to latch said coupling parts resiliently to one another, when said plug part is inserted, by overtaking movement of the second named aircraft relatively to the first named aircraft, into said socket part; and to yield resiliently so as to allow said coupling parts to be forcibly separated upon said second named aircraft being allowed to recede relatively to said first named aircraft; a latch locking member slidably mounted in one of said coupling parts for movement between an inoperative position and an operative position in which it positively obstructs said latching means and prevents it from yielding resiliently from the latching position so as to allow separation of said coupling parts; and remotely controllable means for moving said locking member to and from said operative position.

28. Apparatus as set forth in claim 27 in which the means for moving the said locking member comprises an actuator operated by fluid pressure.

References Cited in the file of this patent

UNITED STATES PATENTS

| Number | Name | Date |
|---|---|---|
| 1,728,449 | Procofieff-Seversky | Sept. 17, 1929 |
| 1,806,833 | Ullendorff | May 26, 1931 |
| 1,848,372 | Moran | Mar. 8, 1932 |
| 1,867,902 | Weaver | July 19, 1932 |
| 1,969,430 | Shinn | Aug. 7, 1934 |
| 2,166,575 | Atcherley | July 18, 1939 |
| 2,199,588 | Cobham et al. | May 7, 1940 |
| 2,376,834 | Thompson | May 22, 1945 |
| 2,443,276 | Seevers | June 15, 1948 |
| 2,582,609 | Steele | Jan. 15, 1952 |

FOREIGN PATENTS

| Number | Country | Date |
|---|---|---|
| 346,181 | Great Britain | Apr. 9, 1931 |

OTHER REFERENCES

"Flight" Magazine, pp. 200–204, August 23, 1945.